US009643729B2

(12) United States Patent
Walter-Robinson

(10) Patent No.: US 9,643,729 B2
(45) Date of Patent: May 9, 2017

(54) ENERGY CELL REGENERATIVE SYSTEM FOR ELECTRICALLY POWERED AIRCRAFT

(71) Applicant: ElectronAir LLC, Guilford, CT (US)

(72) Inventor: Dale Martin Walter-Robinson, Guilford, CT (US)

(73) Assignee: ElectronAir LLC, Guilford, CT (US)

( * ) Notice: Subject to any disclaimer, the term of this patent is extended or adjusted under 35 U.S.C. 154(b) by 438 days.

(21) Appl. No.: 14/679,653

(22) Filed: Apr. 6, 2015

(65) Prior Publication Data

US 2017/0057650 A1   Mar. 2, 2017

Related U.S. Application Data

(60) Provisional application No. 62/015,359, filed on Jun. 20, 2014.

(51) Int. Cl.
*B60L 11/12*   (2006.01)
*B61C 9/38*    (2006.01)
(Continued)

(52) U.S. Cl.
CPC .......... *B64D 27/24* (2013.01); *H02K 7/1823* (2013.01); *H02P 4/00* (2013.01);
(Continued)

(58) Field of Classification Search
CPC ...... H02K 7/1823; B64D 27/16; B64D 27/20; B64D 27/24
(Continued)

(56) References Cited

U.S. PATENT DOCUMENTS 1,362,753 A  * 12/1920 Sperry .................. B64D 41/00
                                                        180/2.2
1,495,036 A  *  5/1924 Palmer .................. B64D 27/04
                                                         244/58
(Continued)

FOREIGN PATENT DOCUMENTS

| WO | 2010041098 A1 | 4/2010 |
| WO | 2014011255 A2 | 1/2014 |
| WO | 2015019597 A1 | 2/2015 |

OTHER PUBLICATIONS

International Search Report and Written Opinion of the International Searching Authority Application No. PCT/US15/36332 Completed: Sep. 4, 2015; Mailing Date: Sep. 30, 2015 18 pages.

*Primary Examiner* — Tulsidas C Patel
*Assistant Examiner* — Thomas Quigley
(74) *Attorney, Agent, or Firm* — Whitmyer IP Group LLC

(57) ABSTRACT

A system for providing regenerative power for an aircraft to sustain flight includes multiple energy cells disposed within the aircraft, the energy cells being configured to supply power to a propulsion motor and electronics of the aircraft, a fan generator harnessing propeller blast created by an aircraft propeller and converting kinetic energy of the propeller blast into electrical energy, a charger receiving the electrical energy generated by the fan generator and using the electrical energy to recharge one or more of the energy cells, and a power transfer switch selectively connecting one of the energy cells to the propulsion motor and electronics of the aircraft, such that the energy cells are rotated one at a time to power the propulsion motor and electronics. During recharging, the one or more of the energy cells are disconnected by the power transfer switch.

26 Claims, 14 Drawing Sheets

(51) Int. Cl.
*B64D 27/24* (2006.01)
*H02P 4/00* (2006.01)
*H02K 7/18* (2006.01)
*B64D 27/02* (2006.01)
*H02K 53/00* (2006.01)

(52) U.S. Cl.
CPC ........ *B64D 2027/026* (2013.01); *H02K 53/00* (2013.01); *Y10S 74/09* (2013.01)

(58) Field of Classification Search
USPC .................. 290/16, 44, 54, 55; 244/1 R, 58
See application file for complete search history.

(56) References Cited

U.S. PATENT DOCUMENTS

| | | | | |
|---|---|---|---|---|
| 1,571,492 | A * | 2/1926 | Rosenbaum | B64D 41/00 244/58 |
| 1,634,167 | A * | 6/1927 | Wilson | B64C 11/00 123/179.29 |
| 1,781,081 | A * | 11/1930 | Rohlfs | G09F 21/10 244/58 |
| 3,069,116 | A * | 12/1962 | Ward | F03D 9/00 244/58 |
| 3,076,510 | A | 2/1963 | Piel | |
| 3,876,925 | A | 4/1975 | Stoeckert | |
| 4,477,040 | A | 10/1984 | Karanik | |
| 4,583,035 | A | 4/1986 | Sloan | |
| 4,605,185 | A * | 8/1986 | Reyes | B64D 27/24 244/55 |
| 4,676,458 | A * | 6/1987 | Cohen | B64D 41/007 244/58 |
| 4,717,095 | A * | 1/1988 | Cohen | B64D 41/007 244/58 |
| 4,742,976 | A * | 5/1988 | Cohen | B64D 41/007 244/58 |
| 5,150,859 | A * | 9/1992 | Ransick | B64C 23/065 244/199.3 |
| 5,224,663 | A * | 7/1993 | Criswell | B64D 5/00 244/1 R |
| 5,398,780 | A * | 3/1995 | Althof | B64D 41/007 185/39 |
| 5,998,882 | A | 12/1999 | Alston | |
| 6,456,040 | B1 | 9/2002 | Hamilton | |
| 6,568,633 | B2 * | 5/2003 | Dunn | B64D 27/24 244/53 R |
| 7,380,751 | B1 | 6/2008 | Henson | |
| 7,786,610 | B2 | 8/2010 | Potter | |
| 8,509,992 | B1 | 8/2013 | Bosworth | |
| 8,791,586 | B2 | 7/2014 | Ortiz et al. | |
| 2003/0075643 | A1 | 4/2003 | Dunn | |
| 2006/0272863 | A1 | 12/2006 | Donahue | |
| 2009/0206657 | A1 | 8/2009 | Vuk et al. | |
| 2009/0212626 | A1 | 8/2009 | Snyder et al. | |
| 2010/0064689 | A1 | 3/2010 | Reinhardt | |
| 2012/0056040 | A1 | 3/2012 | Brotherton-Ratcliffe et al. | |
| 2012/0209456 | A1 | 8/2012 | Harmon et al. | |
| 2013/0071232 | A1 | 3/2013 | Taneja et al. | |
| 2014/0097290 | A1 | 4/2014 | Leng | |

* cited by examiner

Battery Charge & Discharge Sequence Including Timing for Each Switch-Over Of The Relays Used in This Sequence

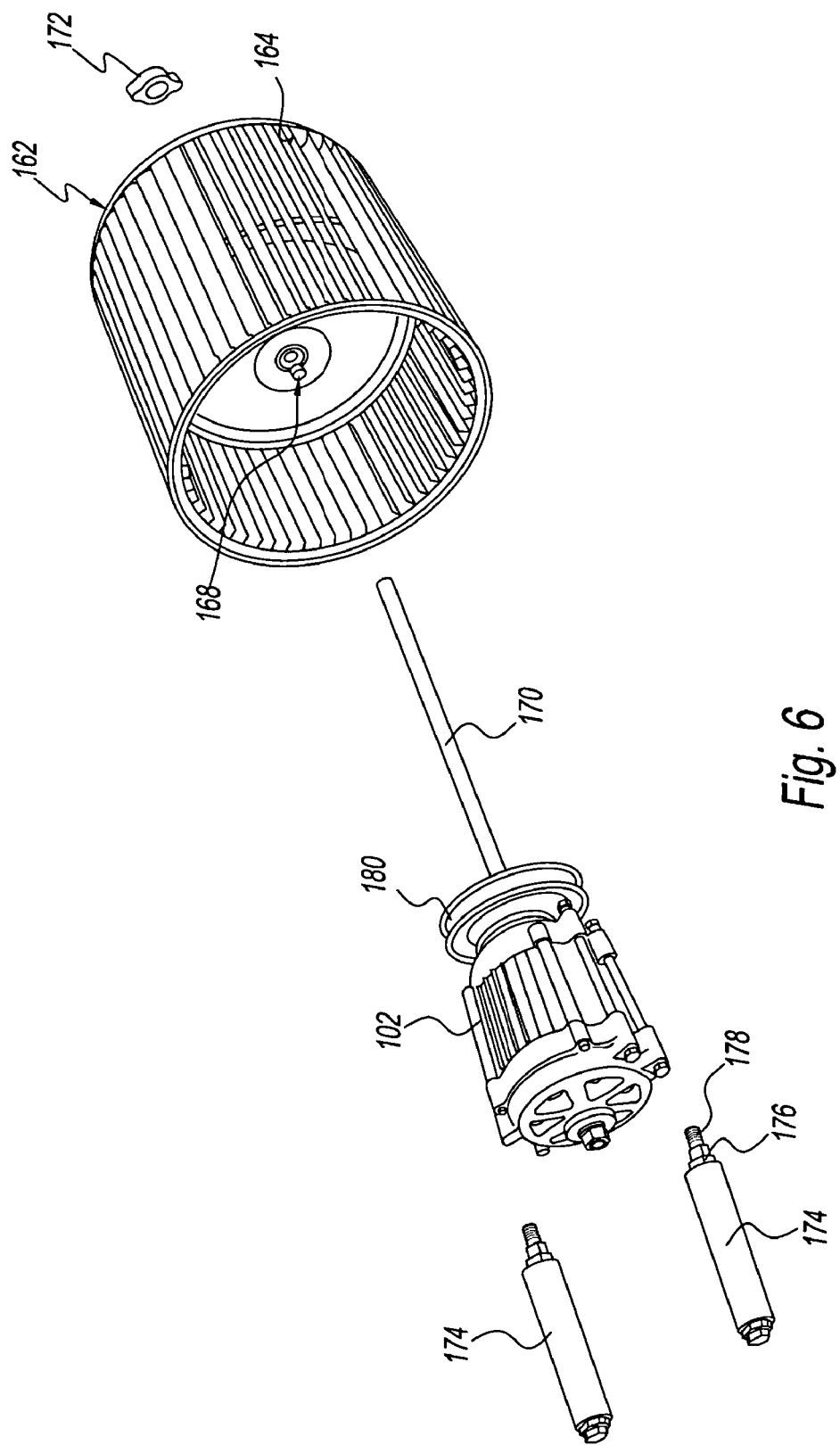

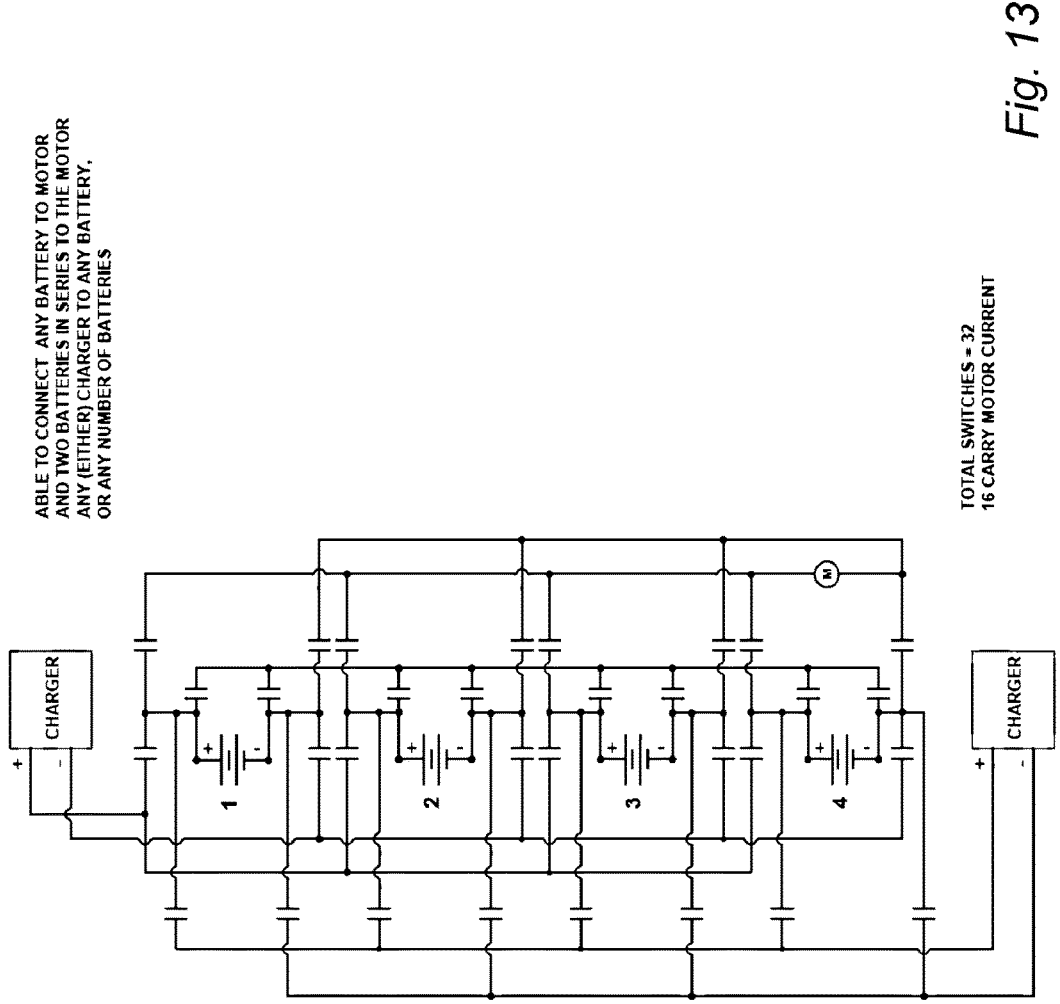

ENERGY CELL REGENERATIVE SYSTEM FOR ELECTRICALLY POWERED AIRCRAFT

FIELD OF THE INVENTION

The present invention is directed to a system providing regenerative power for an aircraft to sustain flight and more specifically an energy cell regenerative system for powering an electrically-powered aircraft.

BACKGROUND OF THE INVENTION

All-electric vehicles, such as road vehicles or rail vehicles, run on electricity only. They are propelled by an electric motor which may be powered by on-board batteries requiring periodic recharging from an external, usually stationary, source. However, a major drawback with electric vehicles concerns their range. After an electric vehicle is driven for some distance and/or time, it is required that the vehicle be recharged at a charging station. Most all-electric cars take a long time to recharge their on-board batteries, thereby requiring substantial downtime.

The above drawbacks also apply to electric aircraft. In particular, propeller-driven electric aircraft have limited range due to inadequate energy cell (or battery) capacity and limited power characteristics (e.g., with respect to wattage, amperage, energy discharging rate, charging rate). To date, there are no Federal Aviation Administration certified all-electric aircraft flying as a result of this problem.

Increasing the number and/or size of batteries or energy cells in attempt to extend range of flight is impractical and undesirable because doing so increases the weight of the aircraft and changes the load distribution in the aircraft. It is well known that weight and balance limits of any aircraft are critical to flight safety. The increase in weight and shift in the aircraft's center of gravity compromise flight characteristics of the aircraft and can jeopardize flight safety. For example, operating near or above the maximum weight limitation weakens the structural integrity of the aircraft and adversely affects flying performance. Operation with the center of gravity outside the approved limits results in flying control difficulty.

Other approaches, such as integrating a generator into the propeller shaft or mounting turbine generators outside the aircraft extending beyond the aircraft's aerodynamic profile, are also undesirable because they rob the propulsion motor of power and change the aerodynamics of the aircraft. Further, solar panels mounted on an aircraft's exterior skin fail to provide adequate power to both the motor and on-board electronics and can adversely affect flight characteristics.

Another approach to resolving the inadequate battery capacity of electric vehicles is to provide a power regeneration system. One such device is described in U.S. Pat. No. 8,509,992 to Bosworth. Bosworth describes a system for a car to recharge a battery using atmospheric wind. The system includes a wind-driven turbine, an alternator, and a vehicle battery connected to the alternator, wherein upon rotation of the turbine, the alternator generates electricity to charge the battery. However, this system is rendered ineffective and does not provide recharging capability if there is minimal or no atmospheric wind, or the wind is not directed toward the air intake scoop and turbine, or if the vehicle is stationary. For example, when the vehicle is parked with the engine running (e.g., warming up the car in the garage, car stopped at a street light) the battery is being depleted and not recharged. The Bosworth system also does not control the charging-discharging of a plurality of batteries and does not coordinate which batteries power the vehicle's motor and electronics, which batteries remain idle, and which batteries undergo recharging. Instead, Bosworth teaches that the generated electricity is used to charge one vehicle battery or to directly power the electric motor. During times when the system is charging the vehicle battery as opposed to powering the electric motor, then a conventional combustion engine is needed to propel the vehicle. That is, the Bosworth system is designed only for hybrid vehicles and does not function to power all-electric vehicles. Moreover, this system is not adapted for an aircraft and does not address the issues related to maintaining flight characteristics, load distribution and aerodynamics of the aircraft.

U.S. Pat. No. 3,076,510 to Piel is directed to a wind-propelled electric generator for moving vehicles. Upon harnessing atmospheric wind energy, the generator produces electricity which is stored in a battery. The wind-driven generator may be mounted in and protrude from the leading edge of an aircraft wing or it may be mounted to protrude from the nose. However, the Piel system is not designed to utilize propeller blast and does not recharge multiple batteries that become depleted as a result of powering the vehicle's motor and electronics during normal flight operations. Piel explicitly teaches that the generator serves as an auxiliary generator for emergencies, or as an additional electric generator for a vehicle having a standard motor driven generator. Additionally, the mounting of the generator such that it protrudes from the leading edge of the wing changes the aerodynamics and flight characteristics of the airplane.

U.S. Pat. No. 3,876,925 to Stoeckert and U.S. Pat. No. 8,791,586 to Ortiz et al. each describe a system involving a wind turbine driven generator. Each system is implemented in an automobile and comprises scoops that rotate an armature in the presence of wind, wherein rotation of the armature generates electricity for charging storage batteries. The systems of Stoeckert and Ortiz are not configured for an all-electric aircraft and are merely designed to harness atmospheric wind energy. They do not harness energy from the blast of an aircraft propeller. Further, Stoeckert and Ortiz do not provide a controller that controls the charging-discharging of the batteries and determines which batteries power the electric motor, which batteries remain idle, and which batteries undergo recharging. Their systems do not include a charge controlling device which monitors the velocity of the propeller blast and provides a constant charging level if the blast velocity varies.

Accordingly, in view of prior art systems, there is no on-board aircraft solution, without compromising aircraft weight and/or performance, for regenerating or increasing battery capacity in flight to extend range of travel. It would be beneficial to provide a regenerative system which recharges one or more energy cells without relying on the presence of atmospheric wind or requiring constant motion of the vehicle. It is further beneficial to provide a regenerative system configured for implementation in an all-electric or hybrid propeller aircraft. It is also beneficial to provide a regenerative system that imposes minimal change in flight characteristics and aerodynamics of the aircraft.

SUMMARY OF THE INVENTION

The needs set forth herein as well as further and other needs and advantages are addressed by the present embodiments, which illustrate solutions and advantages described below.

It is an object of the present teachings to provide a power system for an all-electric or hybrid aircraft such that the aircraft has the same, substantially the same, or an extended range of travel compared to conventional gas-powered aircraft.

It is an object of the present teachings to provide a system for regenerating/recharging one or more energy cells that power an all-electric or hybrid aircraft, thereby extending energy cell capacity and range of flight. As used herein, the term "energy cell" encompasses batteries (e.g., lead-acid, nickel-cadmium, nickel-zinc, nickel metal hydride, lithium-ion, lithium polymer, etc.), electrochemical cells, fuels cells, capacitors, supercapacitors, ultracapacitors and the like. Further, the term "energy cell" may refer to multiple energy cells combined into a group.

It is another object of the present teachings to provide a regenerative system for regenerating/recharging one or more energy cells which power an all-electric or hybrid propeller aircraft by harnessing energy from the propeller blast. The term "propeller blast", also known as "prop blast", refers to the fast rush of air produced by a rapidly spinning screw-type device like a propeller.

It is a further object of the present teachings to provide a regenerative system for regenerating/recharging one or more energy cells of an all-electric or hybrid aircraft which does not change or only changes minimally the flight characteristics and aerodynamics of the aircraft (e.g., does not increase weight of aircraft substantially).

It is yet another object of the present teachings to provide a system which provides coordinated charging and discharging of a plurality of energy cells to continuously power an all-electric or hybrid aircraft during flight.

The present teachings also provide a method for regenerating/recharging one or more energy cells of an all-electric or hybrid aircraft that achieves the above objectives.

The present teachings also provide a computer algorithm for regenerating/recharging one or more energy cells of an all-electric or hybrid aircraft that achieves the above objectives.

The system according to one embodiment of the present teachings includes, but is not limited to, at least one fan generator mounted on an aircraft at a location near a propeller, a plurality of energy cells (e.g., batteries), and a charger. The energy cell's state of charge is maintained in rotation with one another to continuously power the propulsion motor (which spins the propeller) and the aircraft electronics. The charger uses electricity generated by the fan generator to seamlessly recharge one or more of the energy cells which have depleted below a predefined threshold. The fan generator is designed to harness the kinetic energy of the propeller blast in an efficient manner and convert the kinetic energy into electrical energy. The propeller blast is strong enough to spin the fan generator at RPMs that produce desired voltage and amperage to enable simultaneous charging of multiple batteries at a given moment in time.

The at least one fan generator is mounted to the all-electric aircraft such that the flight characteristics and aerodynamics of the aircraft remain unchanged or undergo minimal change. In some embodiments, the at least one fan generator comprises a generator mounted at the nose of the aircraft behind the propeller blades (e.g., downstream of airflow generated by propeller) generally within the aerodynamic profile of the aircraft. Preferably, the generator is mounted within or mostly within the cowling of the aircraft, which is configured with a faired opening towards the propeller blades. The prop blast produced by the propeller then encounters the fan generator and turns its rotor blades.

The generator may also be accompanied with an intake scoop to funnel the prop blast towards the rotor blades of the fan generator.

The fan generator may be mounted inside the aircraft cowling below the axis of rotation of the propeller blades. In addition or alternatively, the fan generator may be mounted to the left or right of the propeller's axis of rotation. Still, in some instances, the fan generator may be mounted within the cowling of the aircraft at a location above the propeller's axis of rotation. The mounting of the fan generator inside or mostly inside the cowling is preferable because such arrangement minimizes change in the flight characteristics of the aircraft. Nevertheless, in some instances, the fan generator may be mounted underneath the cowling. Such a configuration allows for the energy cell regenerative system to be easily implemented into the aircraft. It is also to be understood that an existing cowling of an aircraft can be modified to provide additional room for the integration of the energy cell regenerative system, while substantially maintaining the original aerodynamic characteristics of the aircraft.

With respect to embodiments where the propeller(s) of the aircraft is positioned on the wings, the fan generator may be mounted within an upper or lower portion of the wing behind the propeller blades in the path of the prop blast. The fan generator in this respect is designed such that it can be installed inside the wing, which is configured with a corresponding faired opening. In alternative embodiments, instead of the fan generator being installed directly behind the wing-mounted propeller, the fan generator may be installed within another portion of the aircraft (e.g., fuselage, inboard section of wing) and an air intake scoop and duct assembly is used to harness and deliver the prop blast from the faired opening to the fan generator.

The fan generator may comprise a constant-speed fan generator. That is, the fan generator operates at a constant speed, wherein a rotor drives the generator at a constant rotational speed. The use of a constant-speed operation helps to provide a steady electrical output for charging the one or more energy cells. Alternatively, the fan generator may be a variable-speed type generator. The variable-speed generator provides more efficient energy conversion compared to the constant-speed generator. In particular, the rotor of the variable-speed generator speeds up with higher airflow (e.g., prop blast in combination with head wind), while providing reduced torque. This helps minimize mechanical loads imposed on the drivetrain. For improved efficiency, the rotor speed of the variable-speed fan generator is proportional to the velocity of the airflow reaching the generator. In particular, the rotor speed may be a linear function of airflow velocity (e.g., prop blast velocity), such that during periods of increasing airflow velocity, the rotor increases speed in corresponding manner. In periods of decreasing airflow velocity, the rotor decreases its speed.

In some embodiments, the energy cells are characterized with a fast charging rate. For example, an energy cell can charge to full or substantially full capacity level (e.g., 80%-100%) from 10-30% level in approximately 15 minutes. The energy cells are also ruggedized so that they withstand numerous discharge-charge cycles without significant power loss. As an example, each energy cell can undergo 2,000-3,000 discharge-charge cycles. Other examples of the energy cell have 3,000-5,000 discharge-charge cycles. It is well known in battery technology that the depth of discharge determines the cycle count of the energy cell. The shorter the discharge (i.e., low depth of discharge), the longer the energy cell will last. By avoiding full discharges and charging the energy cells more often between uses prolongs the overall lifespan of the energy cells. In general, the lifespan of each energy cell is in the range of multiple years (e.g., 3-8 years).

The charger has a charging circuit which includes a switch to electrically connect to one or more of the plurality of energy cells. More specifically, the switch connects to the energy cells that are depleted or have a power level less than a predefined low capacity threshold, such as a value between 10%-60%. As one example, the charger charges the one or more batteries that exhibit a power level less than 50%, and where multiple batteries meet this criterion, the charger charges these batteries simultaneously in parallel or in series. The regenerative system may be designed such that each energy cell has its own predefined low capacity threshold or all the energy cells share the same predefined low capacity threshold. Any energy cell that charges to a power level greater than a predefined high capacity threshold (e.g., any value between 70%-100%) may be considered fully charged and accordingly disconnected by the switch so that the energy cell ceases to be recharged. Alternatively, the energy cells may be left connected to the charger in order to provide balance charging. The charger may further include an AC/DC rectifier and/or transformer (e.g., DC/DC converter), wherein the rectifier makes any necessary conversion of AC power into DC power and the transformer steps up or steps down the voltage. In some embodiments, the charger is a smart charger, which has the ability to communicate with a battery management system of each energy cell in order to control and/or monitor the charging process.

In another embodiment of the present teachings, the system includes, but is not limited to, at least one fan generator mounted on an aircraft at a location behind the aircraft's propeller, a plurality of energy cells (e.g., batteries) that alternate to power the aircraft motor and electronics, a charger that recharges one or more of the energy cells using the electricity produced by the fan generator, and a controller for coordinating usage of the energy cells. The controller comprises a processor, microprocessor, other processing unit, or electronic control unit. The controller contains a control system/algorithm which determines which energy cells are to be recharged, which energy cells are to be used for powering the aircraft, and which energy cells are to be maintained in reserve as backup power and/or emergency power. More specifically, the controller determines a group of energy cells to use for powering the aircraft motor and electronics (e.g., during different phases of flight, for example cruise, descent/final approach, etc.), thereby discharging these energy cells in a consecutive/sequential order, while at the same time controlling the charger to recharge other depleted energy cells simultaneously. The discharging of energy cells in consecutive or sequential order means that one energy cell is used to power the aircraft and once this energy cell is discharged fully (i.e., below a predefined low capacity threshold), another energy cell is used to power the aircraft, and so on and so forth. By utilizing data concerning power/electricity generated by the fan generator, data concerning power levels of each energy cell, and data concerning charge and discharge rates of the energy cells, the controller can provide efficient switching instructions for charging/discharging energy cells and thus continuously power the aircraft motor and electronics.

The controller is also connected to the fan generator, charger, and/or plurality of batteries to control these components and monitor their status and health. For example, the controller tracks, measures and collects data pertaining to the amount of electricity generated by the fan generator, power output, voltage and current levels, active power, reactive power, power factor, blade pitch angle of the fan generator, rotor rotational speed, fluctuations in rotational speed, operation mode, temperature, the presence or absence of abnormalities in various sensors monitoring the fan generator, warning indicators, other operational statuses, and the like. The controller tracks, measures and collects data relating to the operation of the charger, including which energy cells are currently being recharged and the rate at which the energy cells are being charged. The controller further includes a timer which keeps track of how long a specific energy cell has been charging.

With knowledge of the technical specification of each energy cell, the controller can utilize time data pertaining to how long the energy cell has been used (i.e., discharged) and/or how long it has been recharged to calculate its real-time power level and to determine the extent (e.g., length of time) the energy cell must be recharged. In some embodiments, the controller monitors the discharge rate of the energy cell and utilizes this information to determine a recharging rate and time to be applied once the energy cell is connected to the charger. For example, a recharging rate may be calculated to be proportionate to the rate at which the battery previously discharged. In addition to the preceding or alternatively, the system further includes one or more sensors (e.g., voltmeter, battery sensor, fiber optic current and voltage sensor) for each energy cell to measure the power level of the energy cell. The one or more sensors then transmit this data to the controller which analyzes the data to provide feedback (closed) loop control, PID control, adaptive feedback control, iterative learning control, and/or other control methods for the regenerative system. The collection and analysis of power level data by the controller may be used independently or in conjunction with the data received by the charger from each of the energy cells.

The controller transmits control signals to the fan generator, charger, energy cells, and/or sensors and receives data from these system components via wired connection or wireless connection (e.g., Bluetooth, Wi-Fi, infrared, etc.).

In some embodiments, the energy regenerative system further comprises an airflow sensor (e.g., pitot tube) for measuring the airflow velocity (e.g., velocity of prop blast) within the intake scoop. The controller uses the data from the airflow sensor and sensors on the fan generator in order to maintain an optimal relationship between the rotor speed and the airflow velocity. For example, with a constant speed fan generator, the controller can monitor the prop blast velocity and adjust in real-time the pitch angle of the rotor blades of the fan generator. The fan generator specifically includes one or more servos or governors to change the pitch angles of each of the rotor blades. This real-time adjustment of the rotor blade pitch angle helps compensate for variations in prop blast velocity, provides for a constant rotational speed in the fan generator, and in turn regulates the power output from the fan generator. As another example, the controller controls the fan generator as a variable-speed generator such that the rotational speed tracks the prop blast velocity. This configuration of the system offers beneficial energy conversion. The controller can immediately increase rotor speed during increasing prop blast velocity (for example, caused by increasing rotational velocity of propeller) and immediately decrease rotor speed during decreasing prop blast velocity (for example, caused by decreasing rotational velocity of propeller). The controller also utilizes the data on velocity of the prop blast to control the charger so that a steady charge level is transmitted to the energy cells regardless of any fluctuations in airflow. The system may also comprise a movable hood or damper door that is positioned adjacent or proximate to the fan generator along the faired opening in the cowling. The damper door functions as a mechanical speed control mechanism, which can control rotational speed of the fan generator, improve aerodynamics, and/or reduce friction. For example, in zero headwind flying conditions, the damper door may be adjusted into in a more closed configuration, which produces a smoother section of the cowling and thereby reduces drag and promotes laminar flow. The damper door can be adjusted automatically by the controller and/or manually by the pilot.

In yet other embodiments of the present teachings, the system includes, but is not limited to, at least one fan generator mounted on an aircraft to harness prop blast energy from the aircraft's propeller, a plurality of energy cells (e.g., batteries) that rotated in sequential/consecutive order to power the aircraft motor and electronics, a charger that recharges one or more of the energy cells using the electricity produced by the fan generator, and a controller for coordinating usage of the energy cells, wherein the controller is part of the charger. In particular, the charger is a smart charger with the controller being a programmable chip embedded within the charger. The smart charger has the capability to communicate with the energy cells and their battery management systems for the purpose of controlling and monitoring the charging process. The embedded programmable chip contains a control system/algorithm which determines which energy cells are to be recharged, which energy cells are to be used for powering the aircraft, and which energy cells are to be maintained in reserve as backup power and/or emergency power. More specifically, the control algorithm determines a group of energy cells to use for powering the aircraft motor and electronics, thereby discharging the energy cells in a sequential order, while at the same time controlling the charger to recharge other energy cells—that have depleted in capacity—in simultaneous manner. The smart charger may also have different charge settings, for example, a safe setting which is designed to charge batteries in a way that maximizes their battery life and a fast setting which is designed to charge batteries quicker.

The method according to one embodiment of the present teachings includes the steps of, but is not limited to, using a plurality of energy cells configured to power an aircraft's electric propulsion motor and on-board electronics; providing electricity to the propulsion motor and on-board electronics by connecting a first group of energy cells in sequential/consecutive order (e.g., during different phases of flight, for example cruise, decent/final approach, etc.); harnessing and converting propeller blast produced by an aircraft propeller into electric energy via a fan generator; recharging a second group of energy cells that are depleted with the electric energy via a charger, the second group of energy cells being recharged at the same time as the first group is providing electricity, and subsequently switching activities/tasks of the first group and second group using a control unit such that the second group provides electricity to the propulsion motor and on-board electronics while simultaneously the first group is being recharged by the charger.

The energy cells in the first group provide electricity in sequential order (i.e., one after another) to the propulsion motor and the on-board electronics of the aircraft. For example, two batteries "1" and "2" are part of the first group of energy cells providing electricity, wherein battery "1" is first used to power the aircraft. Once battery "1" has discharged below a predefined low capacity threshold, it is exchanged—without interruption—with battery "2", which then powers the aircraft until it drops below a predefined low capacity threshold.

The energy cells in the second group are recharged simultaneously by the charger. For example, the second group has two batteries, batteries "3" and "4", which have been depleted previously from powering the aircraft. Both batteries "3" and "4" are charged simultaneously by the charger using the electric energy produced by the fan generator. With this configuration, the amount of time to recharge the second group of energy cells is less than or equal to the amount of time the energy cells in the first group finish discharging. This ensures there is a fresh group of energy cells that are fully or substantially fully charged prior to energy cells in another group discharging below predefined low capacity thresholds.

The method according to one embodiment of the present teachings further includes the step of monitoring the power levels of each of the plurality of energy cells. The controller tracks the real-time power level and rate of discharge of each energy cell in the first group as it powers the aircraft and tracks the real-time power level and rate of charge of each energy cell in the second group during recharging. When the power levels of each of the batteries in the first group of energy cells—e.g., batteries "1" and "2"—drop below predefined low capacity thresholds, the control unit automatically switches the first group with the second group so that the energy cells in the first group undergo recharging and the energy cells in the second group sequentially/consecutively power the aircraft.

Other features and aspects of the invention will become apparent from the following detailed description, taken in conjunction with the accompanying drawings, which illustrated by way of example the features in accordance with embodiments of the invention. The summary is not intended to limit the scope of the invention, which is defined solely by the claims attached thereto.

BRIEF DESCRIPTION OF THE DRAWINGS

FIG. 6 is an exploded view of the fan generator of FIG. 3.

FIG. 13 is a wiring diagram showing the electrical connections between energy cells (e.g., batteries) and a charger of the energy cell regenerative system of FIG. 1.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any system or controller configuration and architecture satisfying the requirements described herein may be suitable for implementing the energy cell regenerative system and method of the present embodiments.

As used herein, the terms "energy cell", in both singular and plural form, encompasses energy packs, power cells, electrochemical cells, batteries, capacitors, supercapacitors, ultracapacitors and the like.

As used herein, the term "aircraft" encompasses propeller-driven aircraft, including propeller airplanes, light sport and ultra-light vehicles and motor gliders, unmanned aerial vehicles and unmanned aerial systems (drones), helicopters, blimps, pusher propeller airplanes, and any aircraft that flies or is adapted to fly under electric power.

One benefit of the present teachings is the ability to provide regenerative power to extend the range of travel of a propeller aircraft. It does so without consuming energy otherwise needed to optimally fly the aircraft. A system according to the present teachings uses the energy from propeller blast to recharge a plurality of energy cells providing power to the aircraft's propulsion motor and on-board electronics. Prior art systems and methods are not configured to do this.

Another benefit of the present teachings is the ability to effectively discharge a group of energy cells in a sequential order for powering the aircraft's motor and on-board electronics while at the same time recharging a set of depleted energy cells simultaneously using energy harnessed and converted from the prop blast of the aircraft.

Another benefit of the present teachings is that the implementation of the energy cell regenerative system does not change or only minimally changes the aerodynamic characteristics of the aircraft.

Figure 1:
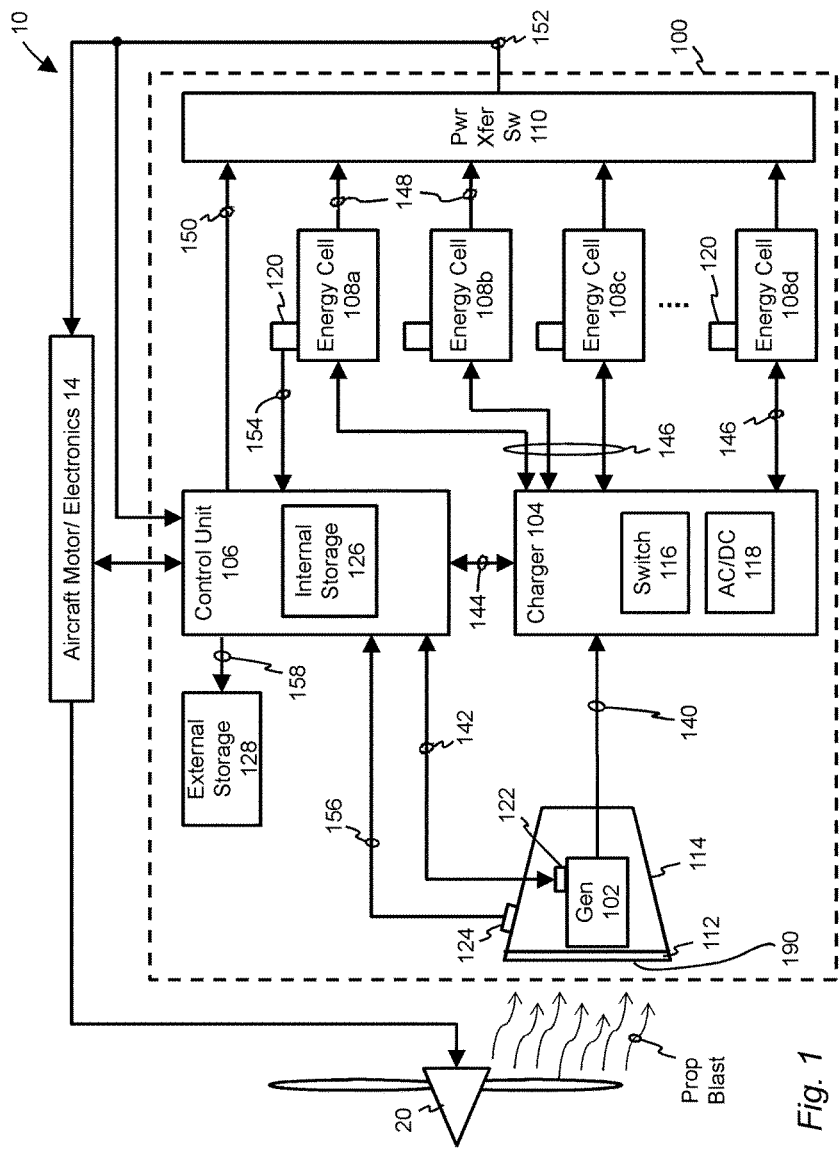
FIG. 1 is a schematic view of one embodiment of the energy cell regenerative system in accordance with the present teachings.

Referring to the figures in detail and first to FIG. 1, there is shown an exemplary embodiment of an energy cell regenerative system electrically powering an aircraft. The regenerative system includes a control unit or controller that manages the charging and discharging operations of a plurality of energy cells. The control unit or controller may comprise a processor, microprocessor, embedded programmable chip, electronic control unit or other processing unit. With the regenerative system, the aircraft can be continuously flown under electric power while it is being seamlessly recharged.

The regenerative system 100 comprises at least one fan generator 102 that is mounted to an aircraft 10 behind a propeller 20, a charger 104, a control unit or controller 106 and a plurality of energy cells 108 (e.g., batteries). As shown in FIG. 1, the system comprises four energy cells 108a-108d. However, the system may be adapted with as few as two or three energy cells or with more than four energy cells. The present invention may be designed such that the system includes one energy cell pack, which is divided into multiple sections or cells 108. Alternatively, the system may include more than one energy cell pack, each pack being divided into multiple sections or cells 108. The energy cells operate in sequential/consecutive order (i.e., one cell is used completely before another cell is used) to seamlessly provide electricity to the aircraft's electric (or hybrid) propulsion motor and on-board electronics 14, as well as provide electricity to the components of the system 100. That is, at any given moment, one of the plurality of energy cells 108 is supplying electric energy through a power transfer switch 110 to the aircraft motor/on-board electronics 14 and components of the regenerative system 100, while the remaining energy cells are either placed in idle mode or are being recharged. Once the one energy cell supplying electric energy depletes below a predefined low capacity threshold, another energy cell—which is fully charged or substantially fully charged—is seamlessly substituted in to supply electric energy. In some instances, the control unit 106 and power transfer switch 110 are configured to initially connect the subsequent energy cell before disconnecting the former energy cell, as a means to reduce any interruption in the flow of electricity to the aircraft motor and electronics. Other embodiments of the regenerative system may be arranged so that multiple energy cells of the plurality of energy cells 108 (electrically connected in series or parallel) simultaneously provide electric energy to the aircraft motor/on-board electronics 14.

The fan generator 102 is designed to harness airflow from prop blast and convert the kinetic energy of the prop blast into torque, which is then used to generate electric energy and amperage. The charger 104 subsequently uses the electric energy and amperage to regenerate/recharge one or more of the energy cells 108 which have been depleted below a specified threshold. The prop blast is strong enough and exhibits a velocity that enables the fan generator 102 to produce electric energy of sufficient amperage for the charger 104 to charge and recharge one or more energy cells 108 simultaneously.

Figure 8:
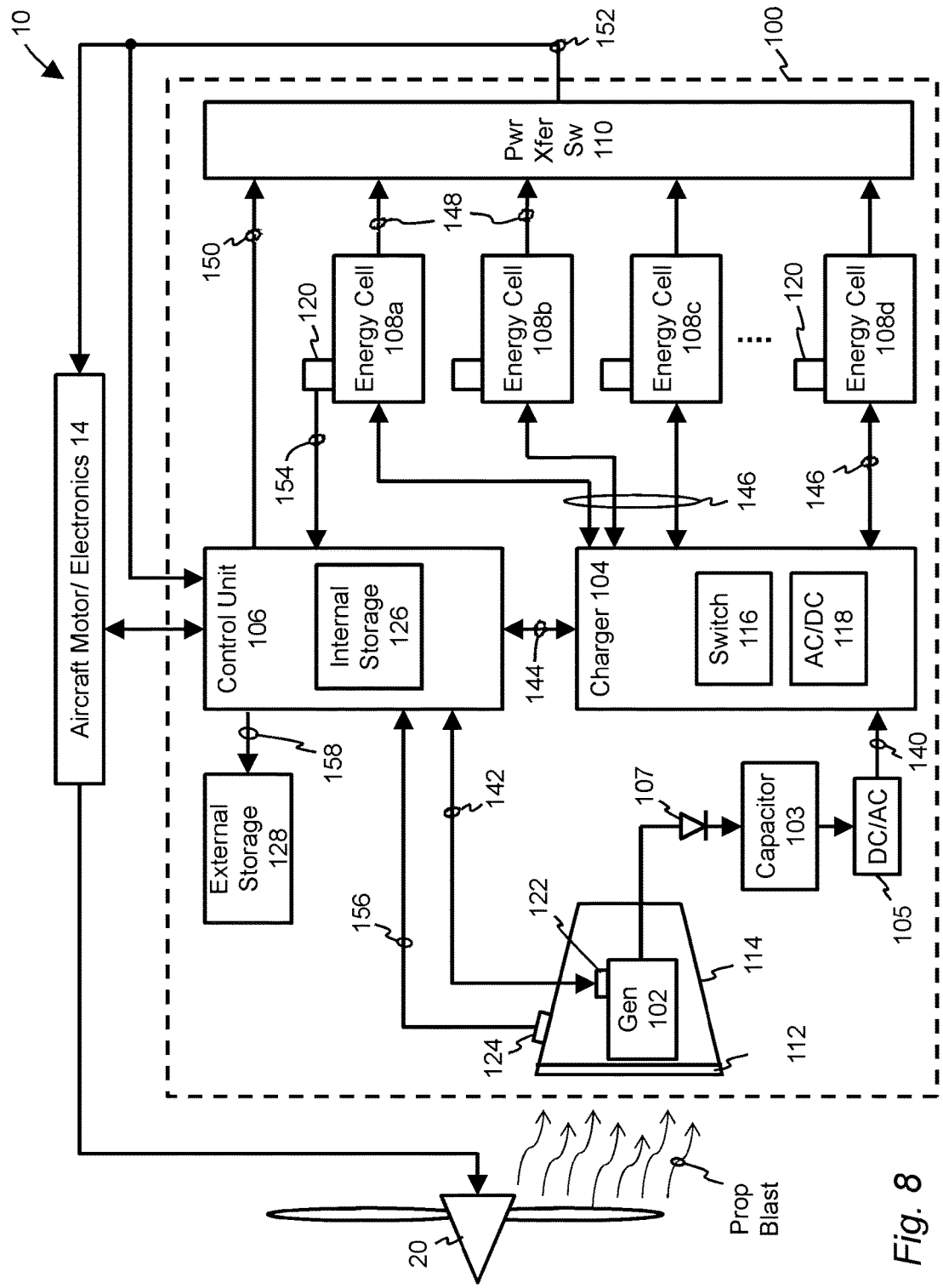
FIG. 8 is schematic view of the energy cell regenerative system of FIG. 1 with a supercapacitor module (or ultracapacitor) electrically connected between the fan generator and the charger.

As shown in FIG. 1, the fan generator 102 is connected by way of a transmission line 140 to the charger 104. The transmission line 140 serves to pass the electric energy (DC or AC) produced by the fan generator to the charger 104 for energy cell recharging. The transmission line 140 is also configured to provide bi-directional communication, transmitting data and/or control signals between the fan generator and the charger. For example, information about the amount of electricity generated in real-time, rotor speed, and total electricity generated since aircraft startup is transmitted to the charger from the fan generator. The fan generator in some embodiments is an alternating current (AC) generator which feeds AC voltage directly to the charger. In other embodiments, the fan generator is a direct current (DC) generator, which is rectified to produce DC voltage and amps (see FIG. 8). The transmission of DC power from the fan generator may be more efficient than sending AC power from the fan generator to the charger. As shown in FIG. 8, a capacitor module, supercapacitor module, or ultracapacitor module 103 can be electrically connected between the fan generator and the charger to minimize voltage spikes in the transmission of power. Prior to reaching the charger 104, the DC power can be converted back to AC via a DC/AC inverter 105. A blocking diode 107 may also be incorporated between the capacitor module 103 and the generator 102 to prevent the capacitor module from turning on the fan generator and spinning the fan.

Referring back to FIG. 1, the charger 104 may be a fast (quick) charger or an ultra-fast charger, which can recharge depleted energy cells in a matter of minutes without damaging the cells' elements. The fast or ultra-fast charging, for example, enables two energy cells (depleted to 20% capacity) to be recharged simultaneously to a 70% or greater state of charge in less than 30 minutes, preferably less than 15 minutes, and more preferably less than 7.5 minutes. Note, the indicated time periods for recharging are merely exemplary and are not limited thereto. An example of the charger may be a 220V/30 A charging unit. The charger may have advanced high frequency switching design with high (e.g., greater than 90%) typical efficiency and be designed with a suitable power factor which minimizes surges and maximizes use of AC power. In order to help keep the temperature of the energy cells under control during the recharging process, at least one cooling fan (not shown) may be positioned proximate to the energy cells 108. Alternatively or in addition thereto, the energy cells 108 may be physically positioned within the aircraft 10 at or within the cowling 22 (see FIG. 5A). This location of the energy cells takes advantage of the natural cooling effect provided by the design of the cowling. Further yet, the energy cells may be disposed at, near, and/or within an intake scoop 114 or exhaust duct 132, such that the propeller blast harnessed and directed within the scoop and duct cools the energy cells (see FIG. 7). An airflow control subsystem, discussed below, may also be implemented to help provide cooling to the components of the energy cell regenerative system 100.

Figure 12:
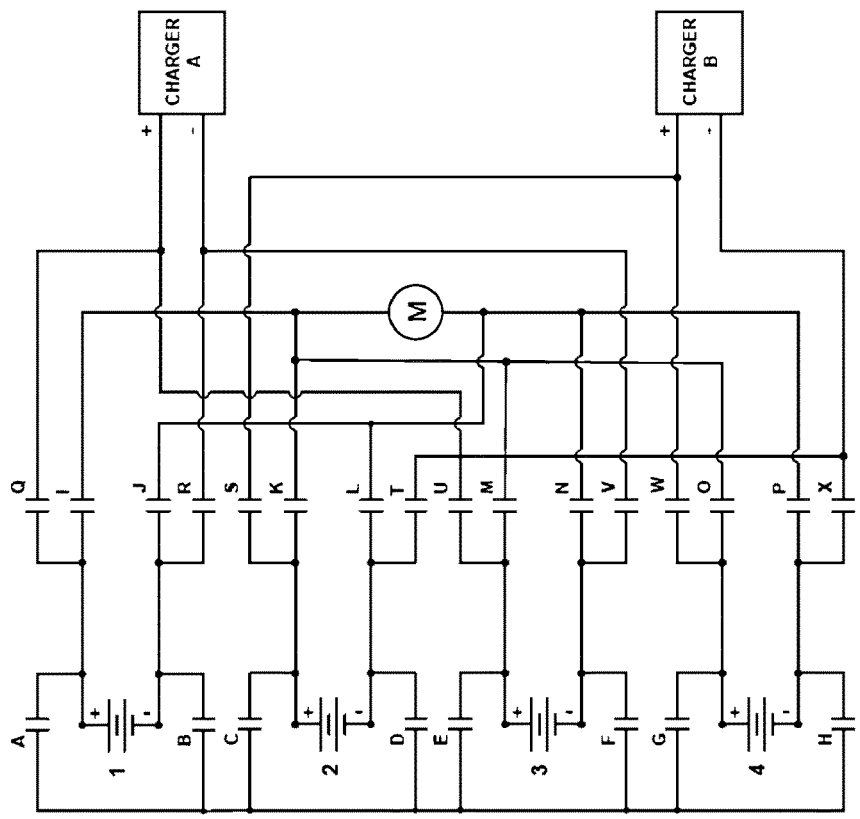
FIG. 12 is a wiring diagram showing the electrical connections between energy cells (e.g., batteries) and a charger of the energy cell regenerative system of FIG. 1.

The charger 104 comprises an AC/DC rectifier or converter 118 to adjust the alternating current (AC) power received through the transmission line 140 into one or more direct current (DC) power outputs. For example, the AC/DC adapter can convert the AC input into a 120V DC output, a 24V DC output, 12V DC output and/or any other voltage DC output. This is beneficial as it allows for the charger to charge energy cells which may have different ratings and specifications. The charger 104 also includes a switch 116 to electrically connect or disconnect one or more of the energy cells 108 through transmission lines 146. As an example in FIG. 1, energy cells 108a, 108b are connected at the same time (in parallel or in series) to undergo recharging, while energy cells 108c, 108d—which are providing electricity to the aircraft motor/electronics 14 and components of system 100—are disconnected from the charger 104. Transmission lines 146 are designed to handle electricity of various amperage and voltage from the charger 104 to the energy cells 108. FIGS. 12-13 are wiring diagrams showing possible electrical connections/disconnections of the energy cells 108 to the charger 104 (e.g., via the switch 116) and to the aircraft motor/electronics 14 (via the power transfer switch 110). For example, in FIG. 12, a two-channel battery charger ("Charger A"=one channel; "Charger B"=another channel), wherein "Charger A" can be connected to one or both of two energy cells (e.g., energy cells "1" and "3") and "Charger B" can be connected to one or both of two energy cells (e.g., energy cells "2" and "4"). Any of the energy cells can be connected to the aircraft propulsion motor M, or any two energy cells in series can be connected to the motor M. FIG. 13 shows another embodiment where each of the channels of the charger can be connected to any energy cell or any number of energy cells. FIG. 13 also shows that any of the energy cells can be connected to the aircraft propulsion motor M, or any two energy cells in series can be connected to the motor M. FIGS. 12-13 also demonstrate that there may be additional electrical components, such as capacitors, involved in the charging and discharging of the energy cells.

In some embodiments, the charger 104 may further be configured as a smart charger having the capability to actively communicate with a battery management system of each of the plurality of energy cells. Accordingly, the smart charger can control and monitor in real-time the charging operations of each energy cell 108. The transmission lines 146 between the charger 104 and the energy cells 108 are adapted to provide the necessary communication links between the components. In particular, each transmission line 146 may be designed under a smart battery system standard with a data bus and communications protocol. Through the transmission lines 146, the smart charger controls the charge rate in an efficient way based on accurate capacity readings of the energy cells and calculation of run times for each of the energy cells. The smart charger is also able to identify the properties of the energy cell 108, including type (e.g., Ni—Cd, Li-ion, etc.), model number, manufacturer, characteristics, and power ratings, once the energy cell is connected to the charger. Such information is used to determine that the correct DC output is supplied to the energy cell when recharging is initiated. It is noted that despite the energy cells 108 being electrically disconnected at times from the charger 104 by the switch 116 (i.e., electric energy is not being pushed into the energy cell), the smart charger 104 may remain in communication with the energy cell. Therefore, the smart charger continuously receives information regarding each energy cell's state of charge (e.g., discharge rate, charge rate) and capacity level.

Although FIG. 1 shows the energy cell regenerative system 100 having one charger 104, the system may comprise a plurality of chargers to charge the energy cells. In some embodiments, each energy cell may be associated with its own discrete charger. In other embodiments, there may be multiple chargers, wherein each charger services one or more energy cells.

The energy cells 108 depicted in FIG. 1 may all be the same type and have the same capacity and power ratings. In some embodiments, the energy cells are lithium polymer batteries. For example, each of the energy cells may be a 120V-80AH lithium polymer battery or a 120V-40AH lithium polymer battery. In other embodiments, the plurality of energy cells 108 may comprise a mix of different rated batteries. As an example, where the regenerative system 100 includes four energy cells 108, two are 120V-80AH lithium polymer batteries and the other two are 120V-40AH lithium polymer batteries. Still, in other embodiments, the regenerative system 100 uses a mix of different types of batteries (e.g., lithium polymer and and nickel cadmium batteries). Generally, the energy cells have one or more of the following characteristics: low mass, high energy discharge (e.g., continuous discharging rate of 30 C and maximum pulse of 60 C and up to 70 C), fast charge rate, low resistance, and the ability to be cycled numerous times without significant power loss. The energy cells, in some embodiments, are smart batteries that can communicate with the smart charger 104.

The energy cells 108 may be designed with screw terminals, which make it easier for the energy cells to be connected in series and/or parallel into larger energy packs. The screw terminals are also beneficial because they allow for an energy cell to be replaced if the energy cell deteriorates or goes bad. Nevertheless, the energy cell regenerative system still functions equally as well when the energy cells 108 have welded or soldered tab connections.

Figure 9:
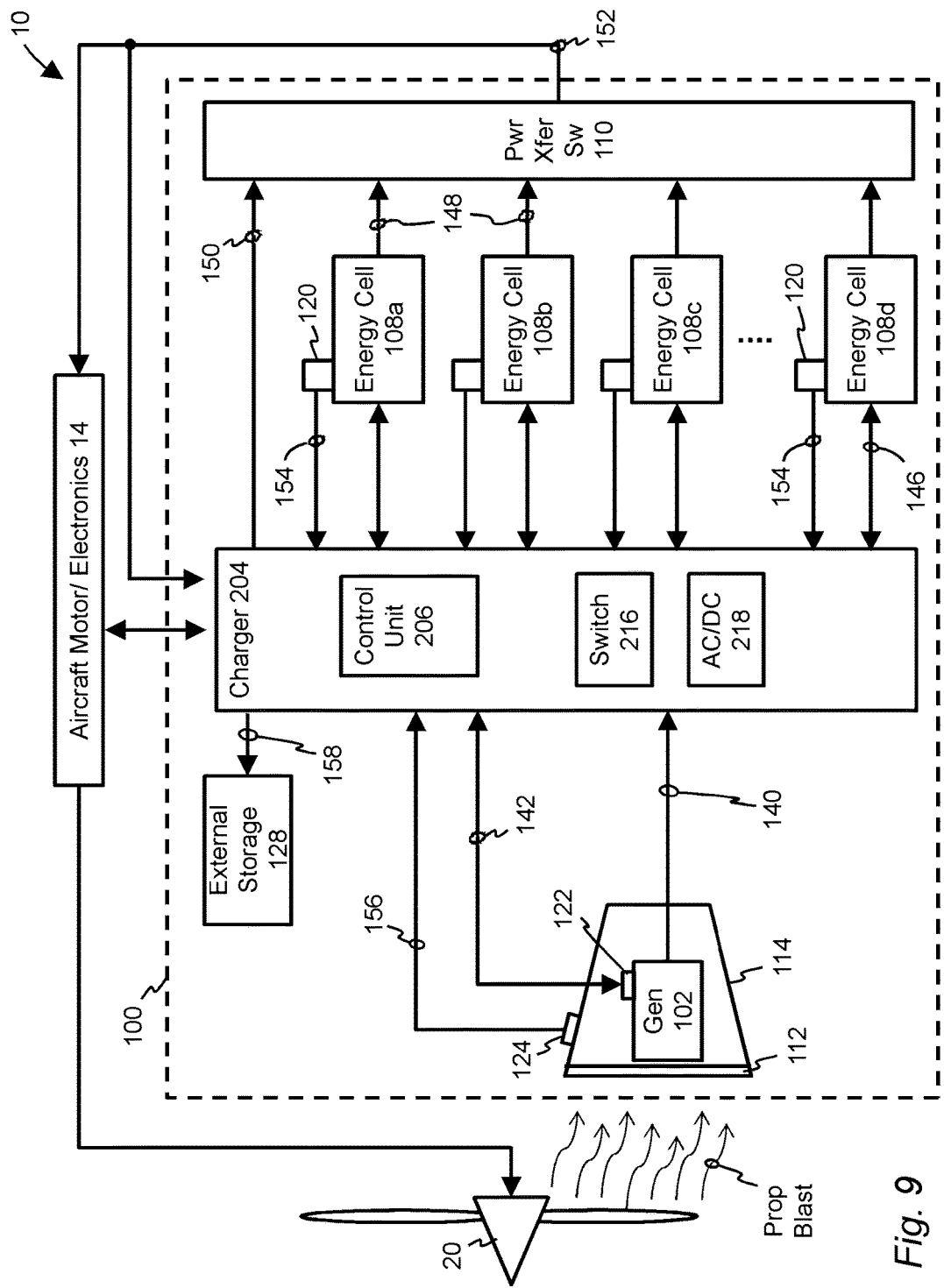
FIG. 9 is schematic view of another embodiment of the energy cell regenerative system in accordance with the present teachings.

The regenerative system 100 also comprises a control unit or controller 106 to coordinate charging operations and discharging operations (i.e., energy cells supplying electricity to aircraft motor/electronics 14 and components of system 100). As shown in the exemplary embodiment of FIG. 1, the control unit 106 may be a separate component or device from the charger 104. However, in other embodiments (see FIG. 9), the control unit may be part of, embedded, and/or integrated in the charger 204, for example an embedded logic chip or embedded programmable controller 206. The control unit 106, which resembles an electronic control unit in automobiles, comprises a processor, microprocessor, or other processing unit. The control unit 106 monitors and tracks the status and health of the fan generator 102, charger 104 and the plurality of energy cells 108. The fan generator 102 may include, or be implemented with, a sensor(s) 122 which measures the rotor rotational speed and blade pitch angle of the fan generator, the power (e.g., active, reactive), voltage, frequency, power factor and the like that is supplied from the fan generator. Such data is then sent to the control unit via a transmission line 142. The control unit can use the data from the sensor 122 to determine whether there are fluctuations in the rotor rotational speed, and if so, control the fan generator to minimize variations in the rotational speed.

The control unit 106 communicates with the charger 104 through a transmission line 144 to retrieve information regarding the rate at which the charger is charging the energy cells 108, the voltage and amperage supplied to the energy cells 108, and the time duration that the charger has been charging a particular energy cell. The control unit 106 is further connected to the energy cells 108 to obtain their capacity levels (i.e., state of capacity). More specifically, the control units 106 may have a direct connection with the battery management system of each of the energy cells 108, in order to monitor the charging process of the energy cells and confirm which energy cells are currently being charged. Alternatively or in addition thereto, a sensor 120 (e.g., voltmeter) is connected to each energy cell 108 which measures capacity level and charging/discharging rate and estimates the remaining time left for the energy cell to reach a certain capacity level (e.g., 70%, 80%, 90%, 100%). The measurements made by the sensor 120 are subsequently transmitted to the control unit 106 via transmission lines 154. For clarity purposes, FIG. 1 only shows one transmission line 154 connecting the control unit 106 with one sensor 120 associated with energy cell 108a.

The control unit 106 may also be configured to collect information regarding the velocity of the propeller blast entering into the faired opening 112 and the intake duct/scoop 114 before reaching the fan generator 102. More specifically, a sensor 124, such as a pressure sensor or a pilot tube, may be mounted along and/or within the intake scoop 114 to measure fluid velocity of the prop blast. The sensor 124 then transmits the velocity data to the control unit through a transmission line 156. The prop blast velocity data can be used by the control unit to adjust in real-time the pitch angle of the rotor blades in the fan generator as a means to compensate for prop blast velocity variations. For example, the fan generator 102 includes one of more servos or governors attached to the rotor 162, wherein the servos or governors receive instructions from the control unit to increase, decrease or preserve the pitch angle of the rotor blades in response to variations in prop blast velocity. In addition, a damper door or movable hood 190, which is positioned proximate to the fan generator 102 along the faired opening 112, may be used to regulate airflow towards the fan generator, thereby increasing, decreasing or maintaining the turbine rotational speed and thus the generator's electrical output, to a degree. The damper door is adjustable (e.g., opening, closing) via servos or actuators, which are operated either by manual input from a pilot or through automated means receiving command signals from the control unit 106. As a result, the combination of the control unit and the one or more governors and/or the damper door help maintain a selected RPM in the fan generator 102 and regulate the power output from the fan generator. In addition to retrieving the prop blast velocity data, the control unit 106 is adapted to obtain the rotational speed of the propeller 20, the actual airspeed of the aircraft 10, the true airspeed of the aircraft 10, and other aircraft data from the aircraft motor/on-board electronics 14.

Each of the data parameters described above may be used by the control unit 106 to adjust and improve charging operations and discharging operations (i.e., powering of the aircraft) of the energy cells. For example, the control unit 106 can send command signals to the fan generator by way of transmission line 142 to adjust the rotor rotational speed to match the velocity of the prop blast and thus provide variable speed control. In some embodiments, the control unit 106 can switch the fan generator 102 between the variable speed mode and a constant speed mode (i.e., wherein the rotor speed is maintained at a constant regardless of the varying prop blast velocity by adjusting blade pitch angle). The control unit 106 is also configured to manipulate the charger 104 and in particular the switch 116. That is, with knowledge of the capacity levels of the energy cells 108, the control unit 106 can control which energy cells are electrically connected to the charger and thus being recharged. Moreover, the control unit can control the extent with which an energy cell is recharged based on a length of time and/or the energy cell reaching a predefined high capacity level, such as a value between 70%-100% (e.g., 80%, 90%, 95%, 100%). The control unit similarly manipulates a power transfer switch 110 through a transmission line 150 to assign which energy cell(s) provides electricity to the aircraft motor/on-board electronics 14 and components of the system 100 through the power line 152. In particular, the control unit 106 sends command signals to the power transfer switch 110 that controls whether the power line(s) 148 from one or more of the energy cells 108 are connected or disconnected to power line 152. The control unit can control the extent with which an energy cell supplies electricity based on a length of time and/or when the energy cell drops below a predefined low capacity threshold, such as a value between 10%-60% (e.g., 60%, 50%, 40%, 30%, 20%, 10%). In some embodiments, at any given moment, only one energy cell is supplying the necessary electricity to power the aircraft motor and electronics. However, in some embodiments, two or more energy cells can be arranged in series or parallel by the power transfer switch 110 to provide electricity to the aircraft motor and electronics.

As shown in FIG. 1, the control unit 106 may include an internal storage unit 126 for saving all the data transmitted to and received by the control unit 106 from other components of the system 100 (e.g., fan generator 102, sensor 122, charger 104, battery management system of energy cell 108, sensor 120, sensor 124). The internal storage 126 may comprise random access memory, hard disk drive, or a combination thereof. As an alternative or an addition to the internal storage, the regenerative system 100 comprises an external storage unit 128 connected to the control unit via a data line 158 for storing data.

The regenerative system 100 may also include a display unit that is connected to the control unit (not shown in FIG. 1). The display unit is adapted to display data pertaining to the operational status and health of the components of the system 100. Capacity levels and charge/discharge rates of each of the energy cells 108 may be displayed. The display unit may also indicate which battery(s) are currently powering the aircraft and which battery(s) are being recharged. The control unit, which is in communication with the battery management system of each energy cell, can track and display on the display unit the life cycle (e.g., number of charge/discharge cycles) of each energy cell. If an energy cell is approaching its maximum life cycle (as designed) or alternatively a specified maximum cycle threshold, the control unit may issue a warning (e.g., audible and/or visual) through the display unit. The display unit also provides a means for a user (e.g., pilot, co-pilot) to manually change parameters and adjust operation of the regenerative system. For example, through the display unit, the user can issue a command to the control unit 106 to adjust the fan generator 102 to be in a constant speed mode or a variable speed mode. The display unit may also give the user the ability to assign which batteries to initially use for powering the aircraft.

The control unit 106 includes a control system, algorithm, or software which performs the above tasks of the control unit, i.e., coordinates and manages which energy cells undergo the recharging process and which energy cells undergo discharging as a result of powering the aircraft, based in part on the phase of flight of the aircraft (e.g., takeoff, climb, cruise, descent/final approach, landing, etc.). The control algorithm or software provides open/close instructions to the power transfer switch 110 and the switch 116 of the charger 104, which dictate whether an energy cell is being recharged, is being used currently to supply power to the aircraft or is placed in idle for later powering the aircraft. Further, the algorithm or software rotates the recharge process among a plurality of energy cells according to time and/or amperage use. That is, the control unit—when running the control algorithm or software—determines a group of energy cells to use for powering the aircraft motor and electronics, thereby discharging these energy cells sequentially (one after another), while at the same time controlling the charger to recharge other depleted energy cells simultaneously.

Figure 2:
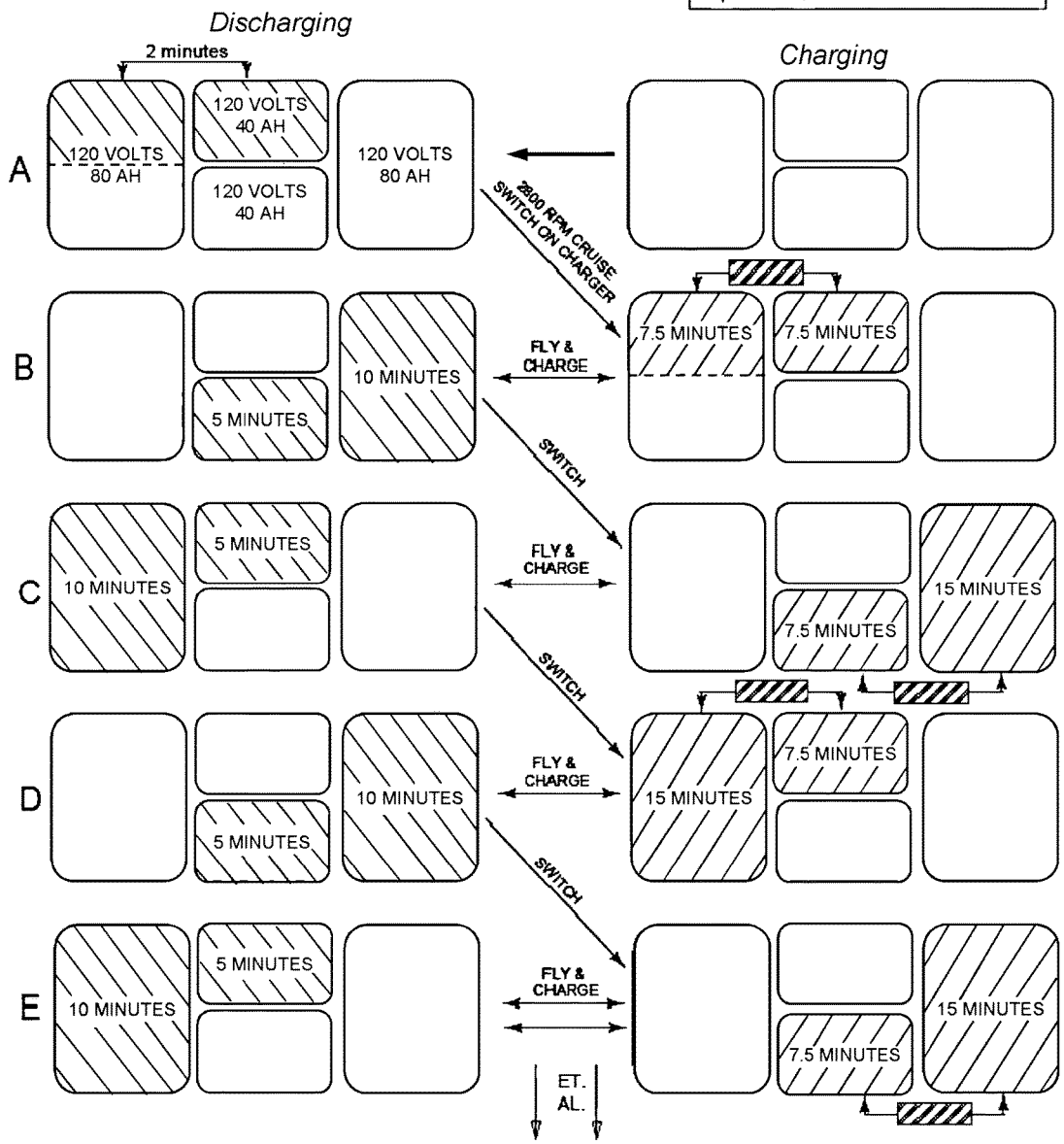
FIG. 2 is a diagram showing details of the charging and discharging of energy cells (e.g., batteries) using a control system/algorithm of the energy cell regenerative system of FIG. 1.

An example of the control algorithm and method of controlling the energy cells is shown in FIG. 2. The charging algorithm is based on the concept of dividing the energy cells into groups, wherein one group (e.g., discharged or depleted) is being charged while another group (e.g., batteries having full or substantially full capacity) is being used to power the aircraft, and the two groups alternate in charging and discharging operations. Further, the charging algorithm is based on the concept of simultaneous charging—i.e., two or more of the energy cells 108 are charged simultaneously in parallel or in series—while other energy cells 108 are being discharged sequentially (i.e., one energy cell is discharged, then another energy cell is discharged).

FIG. 2 is an exemplary arrangement of the regenerative system comprising four energy cells, wherein takeoff and climb uses two of the energy cells combined at the same time (e.g., connected in series) to double the voltage to the aircraft's motor and provide more power. At cruise, with the regenerative system activated, the fan generator generates sufficient amperage from the prop blast to power the charger, which recharges the first two energy cells (used during takeoff and climb), while the aircraft flies using a third energy cell and thereafter a fourth energy cell (once the third energy cell is discharged below a predefined low capacity threshold).

As shown in FIG. 2, energy cells "1" and "4" are 120V-80 AH lithium polymer batteries and energy cells "2" and "3" are 120V-40 AH lithium polymer batteries. That is, the amp-hour ratings of two of the batteries is 50% of the other two batteries. For redundancy and to provide a margin of safety, the control algorithm is programmed such that discharge of the battery is considered complete when it drops below the predefined low capacity threshold. As an example, discharge may be considered complete when the power level falls to the threshold of 30% remaining in the energy cell. In some embodiments, discharge is considered complete when the power level falls to the threshold of 20% remaining in the battery.

In FIG. 2, the shaded blocks in the left column represent energy cells that are being discharged (i.e., powering aircraft motor/on-board electronics 14 and components of system 100). The shaded blocks in the right column represent energy cells that are being charged while the aircraft is running and in flight. Prior to aircraft startup or before the energy cell regenerative system is engaged, the energy cells 108 are fully charged and have the capability of providing e.g., 480 V.

An exemplary control algorithm of the regenerative system 100, as shown in FIG. 2 proceeds as follows:

Stage A:

Discharge: During aircraft startup, taxiing and/or take-off, a first group of batteries 108 are used for powering the aircraft. As an example, battery "1" is first electrically connected, via the power transfer switch 110, to run the aircraft motor and electronics 14. Battery "2" is switched in to power the aircraft motor and electronics after battery "1" has finished discharging below the predefined low capacity threshold. As another example, batteries "1" and "2" are electrically connected in series with each other, via the power transfer switch 110, to simultaneously run the aircraft motor and electronics. This configuration with the batteries "1" "2" combined provides for double the voltage and thus provides more voltage to the aircraft during takeoff. The amount of power (voltage and current) that the aircraft requires depends on the flight performance/phase (e.g., taxi, takeoff, cruise, landing) and weight of the aircraft. With knowledge of the type of batteries used in the regenerative system, the amount of power needed for a particular flight performance, and the measured discharge rate of the batteries, the control unit 106 may be configured to switch in and out energy cells based on time. Alternatively, or in addition thereto, the switching operations can be regulated based on measured capacity (power level) of the batteries. FIG. 2 shows during take-off to 2000 feet, both batteries "1" "2" are used at the same time, with half of battery "1" (total 40 amp-hours) most of battery "2" (40 amp-hours) being used for powering the aircraft. In this example, it is presumed that the aircraft takes approximately two minutes to reach an altitude of 2000 feet. It is noted that batteries "1" and "2" in series are discharged simultaneously, thus providing double the voltage. The highest amperage needed per time elapsed is during the aircraft's take-off. If battery "2" discharges below a predefined low capacity threshold before take-off is completed, the control unit can potentially command that battery "3" provide necessary power to the aircraft.

Charge: None of batteries "1"-"4" are being charged during aircraft startup and take-off since the batteries are at or close to full charge. The control unit uses the capacity information transmitted from the battery management system of each energy cell and/or from the sensor 120 to make this determination. Accordingly, the charger 104 is not connected to the batteries.

Stage B:

Discharge: Straight and level cruise flight at 2000 feet is achieved and maintained by discharging a second group of batteries, battery "3" (40 amp-hours) and thereafter battery "4" (80 amp-hours). For example, as the aircraft reaches level cruise and battery "2" is fully depleted or substantially depleted, the control unit detects this and commands power transfer switch 110 to swap in battery "3". When battery "3" is mostly discharged (e.g., measured capacity drops below a predefined threshold), the control unit then connects battery "4" to power the aircraft. This powering scheme, for example, runs the aircraft e.g., approximately 15 minutes, where battery "3" provides power for 5 minutes and then battery "4" provides power for 10 minutes.

Charge: As the batteries "3" and "4" begin their discharge phase (i.e., powering aircraft motor and electronics), a charging phase of batteries "1" and "2" is initiated by the control unit. In some embodiments, however, the charging phase may be initiated manually (e.g., by pilot, co-pilot). It is noted that the control algorithm may be configured to delay the time when the charging phase begins. Conversely, the control algorithm may be configured or manually adjusted to advance the exchanging of the first group of energy cells with the second battery group of energy cells if the control unit detects that batteries "1" and "2" are discharging towards empty or low capacity at a quicker pace. The control unit 106 controls the switch 116 to electrically connect the charger 104 to batteries "1" and "2". The charger then recharges battery "1" (40 amp-hours) and battery "2" (40 amp-hours) towards full capacity (or above a predefined high capacity threshold, e.g., 90%). This would be the amount of electrical energy used for take-off in the discharge phase of Stage A. Unlike the sequential discharging of batteries, batteries "1" and "2 are charged simultaneously, wherein approximately 40 amp-hours are returned to the batteries. The recharging of batteries "1" and "2" takes around 7.5 minutes. Because there is an additional 7.5 minutes available (given that batteries "3" and "4" are providing power to the aircraft for 15 minutes), batteries "1" and "2" are given a basic balance charge. A balance charge optimizes capacity and equalizes voltage of the individual energy cells.

Stage C:

Discharge: Batteries "1" and "2" are now fully charged and available for powering the aircraft again. Here, the aircraft motor and electronics run on battery "1" until it is substantially discharged and drops below a predefined low capacity threshold. When the control unit detects that battery "1" is low on capacity, it instructs the power transfer switch to connect battery "2" and disconnect battery "1". Thereafter, battery "2" powers the aircraft until the capacity of this battery drops below the predefined low capacity threshold. As shown in FIG. 2, the aircraft is flown for 10 minutes on battery "1" (80 amp-hours) and then 5 minutes on battery "2" (40 amp-hours). Thus, a total of 120 amp-hours from batteries "1" and "2" is discharged in a 15 minute period.

Charge: As batteries "1" and "2" discharge, the control unit initiates the charge phase of batteries "3" and "4", which were previously depleted in stage B. More specifically, batteries "3" and "4" are charged simultaneously, while the plane is flying. It will take approximately 15 minutes total time to recharge the batteries. That is, it will take 15 minutes to restore 80 amp-hours to battery "4" and within that time period, 7.5 minutes to bulk charge battery "3" (40 amp-hours). Bulk charging is fast charging to approximately 85% or more power capacity.

Because battery "3" is charged, but has 7.5 minutes of "idle" time, one channel of the charger 104 continues, but with balance charging. It is advantageous to keep the energy cells relatively balanced in total voltage. The algorithm of the control unit is configured to recharge the batteries such that balance charging is achieved.

Further stages D, E, etc.:

Stages B and C (see above) are repeated continuously during the remaining flight travel of the aircraft. The idle 7.5 minutes experienced by batteries "2" and "3" in their respective charge phase is used to cool down. The life cycle of an energy cell depends on many factors, such as percentage of recharge, temperature of the energy cell, discharge and charge capacity of the energy cell. Upon maximizing charge-discharge efficiency, the aircraft can fly for an extended period of time, for example 50% of the life cycle of the energy cells.

The control algorithm is also designed to detect whether the energy cells (for example the 40 amp-hour batteries "2" and "3") begin to go out of balance. If such a situation occurs, the control algorithm compensates for the out-of-balance by performing a balance discharge. An example of such balance discharge is provided as follows:

Balance Discharge: Flight would be maintained using (sequentially) 50% of battery "1" (40 amp-hours), 100% of battery "2" (40 amp-hours), and 100% of battery "3" (40 amp-hours). Accordingly, the timing which these batteries are electrically connected and supplying electricity to the aircraft would be 5 minutes+5 minutes+5 minutes=15 minutes of total discharge.

Balance Charge: Assuming that there has been one cycle, as discharge occurs, the 50% of battery "1" that needs balancing will be recharged in 7.5 minutes, but will continue to balance charge for another 7.5 minutes, while the other two batteries—batteries "2" and "3"—are fast or bulk charged to 100% capacity. These batteries have been balance charged during the normal cycling (e.g., stages B and C). The total time to achieve this switch to balance charging the 80 amp-hour battery and simultaneously the two 40 amp-hour batteries is 15 minutes. As above, the total time to fly the now three 40 amp-hour segments sequentially is 15 minutes. This balancing feature is used when the control unit detects the need for it.

In some embodiments, the control unit through the charger also performs step up/step down operations. For example, stepping down amperage to charge batteries will be part of the control system: e.g., 100 amps at 60% charge return; 50 amps to 80% charge return; 15 amps to 100% charge return; C1 overcharge (7.5 A/5 seconds on, 5 seconds off), etc.

Figure 3:
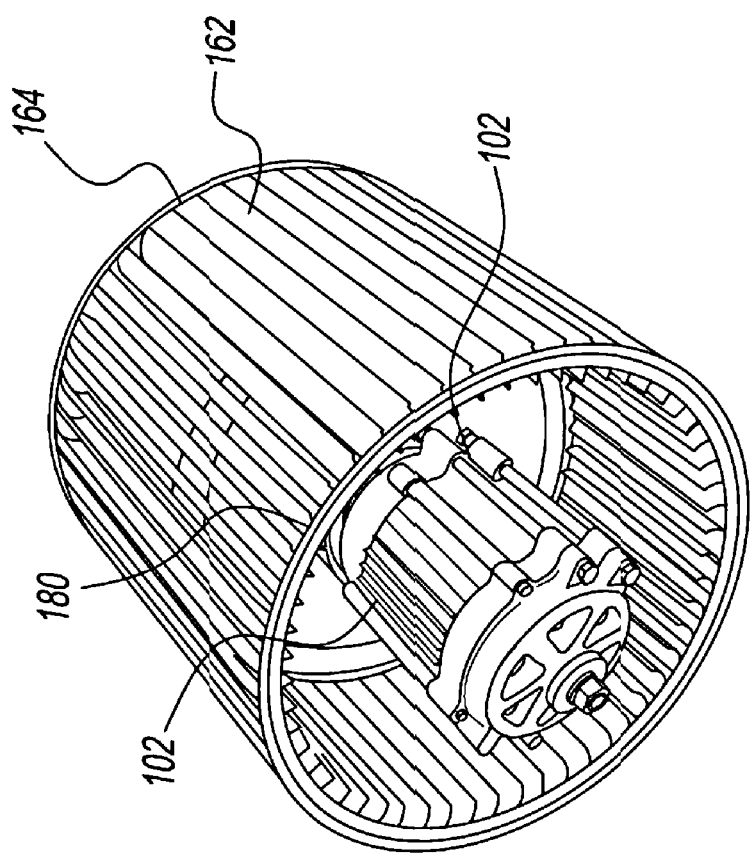
FIG. 3 is a perspective view of the fan generator of the energy cell regenerative system shown in FIG. 1.

FIG. 3 shows mechanical components of the fan generator 102. The turbine fan generator is a key component of the regenerative system 100. Its job is to provide a constant flow of current to the charger 104, with sufficient wattage to keep the charger operating at its maximum efficiency. The fan generator 102 comprises a fan or rotor 162 having a plurality of blades 164 adapted to extract energy from airflow, including propeller blast and atmospheric wind. In preferred embodiments, the rotor 162 is a fan wheel or squirrel cage blower type fan, but in other embodiments, the rotor 162 may be any type. A squirrel cage rotor having a diameter that is 25% (or greater) the diameter of the aircraft's propeller has exhibited acceptable operation in converting the prop blast energy into electrical energy. The squirrel cage rotor, in a preferred embodiment, is made of metal. However, the squirrel cage rotor may be formed from fiberglass, plastic, carbon fiber, any other material suited for flight, or any combination of these materials (including metal). The fan generator 102 is an alternator—single core or dual core (as shown in FIG. 3)—that converts the mechanical energy from rotation of the rotor 162 to electrical energy. With the rotor 162, blades 164, and alternator, the fan generator resembles a turbine. The alternator may be a permanent magnet alternator adapted to produce sufficient amperage to operate the charger 104. However, in other embodiments, the energy cell regenerative system uses any type of generator, magneto or the like.

The fan generator 102 may be designed with a direct drive mechanism, or alternatively, it may have a gearbox, which turns the rotation of the rotor 162 into a quicker rotation more suitable for driving the alternator. The fan generator 102, in some embodiments, operates at a constant speed, wherein the rotor drives the alternator at a constant rotational speed. That is, the rotor speed remains constant for all prop blast velocities. This may be accomplished using one or more servos or governors disposed on rotor 162, alternator, or some other part of the fan generator 102. The servo(s) or governor(s) is configured to adjust the pitch angle of each of the rotor blades 164. One embodiment involves a single governor adjusting all the blades of the rotor simultaneously to a particular angle value. In another embodiment, each rotor blade has its own governor to change blade pitch. The constant speed configuration helps to provide a steady electrical output from the fan generator 102 to the charger 104 for charging the one or more energy cells 108. In other embodiments, the fan generator 102 is a variable-speed type generator, wherein the alternator varies the rotor speed in varying prop blast conditions. This variable-speed configuration of the fan generator provides improved energy recovery over a range of prop blast velocities.

Figure 4:
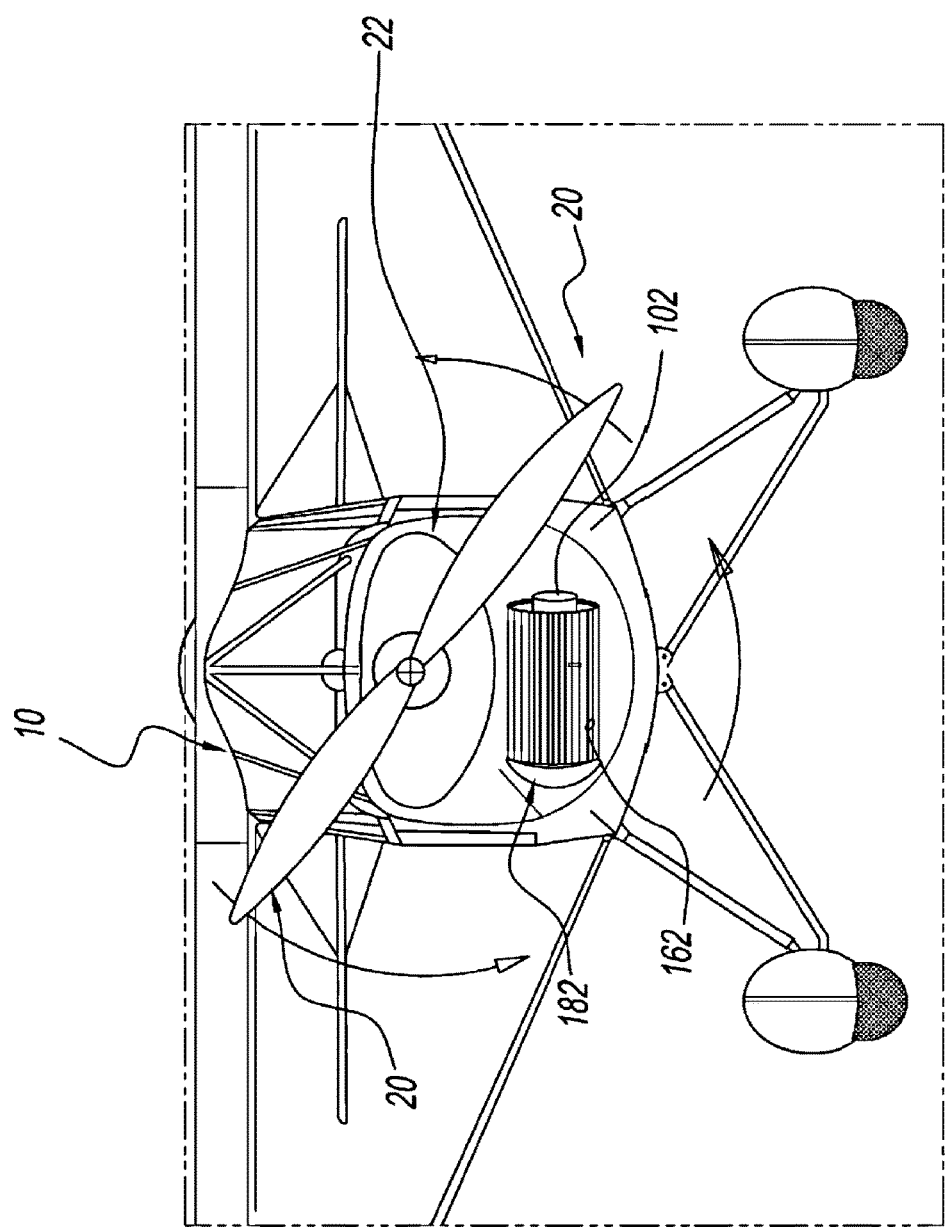
FIG. 4 is a front view of a propeller aircraft driven by an electric propulsion motor, which has the fan generator of FIG. 3 mounted at the nose of the aircraft.

As shown in FIG. 4, the fan generator 102 is mounted just after, or behind the propeller 20. The propeller 20 enables the aircraft to fly. The fan generator 102 is mounted to the nose or cowling 22 of the aircraft 10. The energy cell regenerative system may be implemented into the aircraft with the fan generator being mounted, partially or entirely, on the exterior of the cowling 22. On the other hand, the fan generator is mounted within or mostly within the cowling 22 proximate to a faired opening 112 and intake scoop 114, which directs the prop blast towards the rotor 162 (see FIG. 7). The prop blast is then directed out of the cowling 22 via an exhaust duct 132 and exhaust vent 130 (see FIG. 7). Referring back to FIG. 4, the fan generator 102 is mounted partially inside the cowling 22, with an alignment below the axis of rotation of the propeller 20 and just to the left thereof if the propeller is spinning in a counter-clockwise direction (as viewed from the front of the aircraft). If the propeller 20 is spinning in a clockwise direction (as viewed from the front of the aircraft), the fan generator 102 is mounted with an alignment below the axis of rotation of the propeller 20 and just to the right thereof. Alternatively, the fan generator may be centered with the rotational axis of the propeller 20. Still, the fan generator in some embodiments may be positioned above the rotational axis of the propeller.

FIG. 4 further shows the fan generator 102 mounted with a horizontal-axis configuration, i.e., rotor 162 rotates about a horizontal axis. In alternative embodiments (not shown), the fan generator 102 is mounted with a vertical-axis orientation, such that the rotor 162 rotates around a vertical axis. The fan generator may also comprise at least one aerodynamic fairing 182 positioned at one or both ends of the generator. The aerodynamic fairing 182 covers the gaps and spaces at the ends of the generator in order to reduce drag, including form drag, interference drag, and/or parasitic drag. Additionally, the aerodynamic fairing 182 improves the appearance of the system when installed into an aircraft.

Figure 5A:
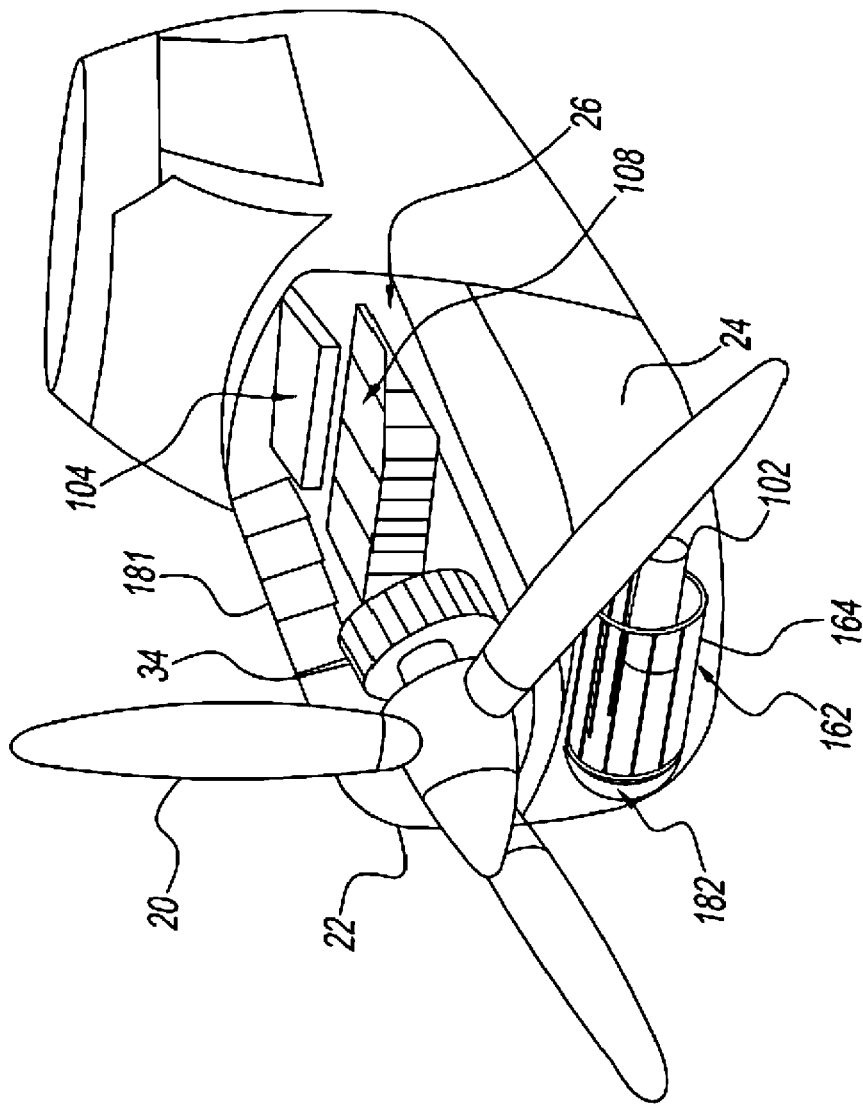
FIG. 5A is a partial, internal view of the nose of the aircraft shown in FIG. 4 with the energy cell regenerative system of FIG. 1 installed therein.

FIG. 5A shows a partial interior view of the nose of the aircraft 10. The propeller 20 is driven by an electric motor 34 mounted on frames 26 such that the air rushing from the propeller 20, known as propeller blast, enters through the faired opening 112, travels through the intake scoop 114 and encounters the fan generator 102 unimpeded. A key feature of the present invention is derived from the fact that an aircraft's propeller blast is "free" energy, which is typically wasted and not conserved/utilized by the aircraft. The energy cell regenerative system harnesses the "free" energy of the propeller blast, funnels that energy to create an artificial wind and exploits that energy to power the aircraft 10, including the electric motor 34 and on-board electronics (also referred to as electric motor and on-board electronics 14). The prop blast pushes the blades 164 of the rotor 162 at the bottom half of the cowling 22, thereby rotating the rotor. The airflow or air stream may be directed towards the bottom half of the fan generator 102 by the intake scoop 114 or a baffle. The fan generator spins at RPMs high enough to produce sufficient amperage for the charger 104 to charge the plurality of energy cells 108 simultaneously.

Figure 5C:
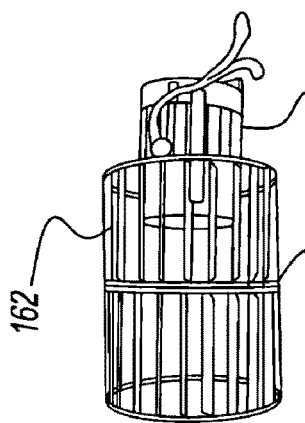
FIGS. 5B-5E show exemplary illustrations of components of the energy cell regenerative system of FIG. 1.
Figure 5E:
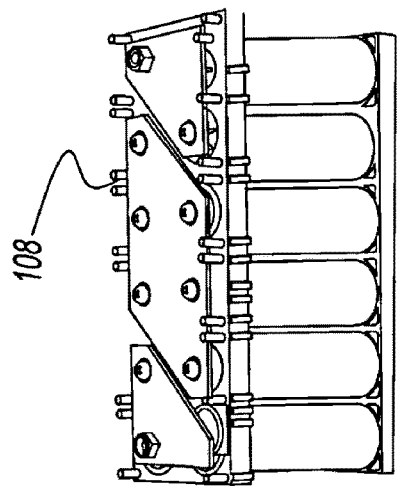
Figure 5B:
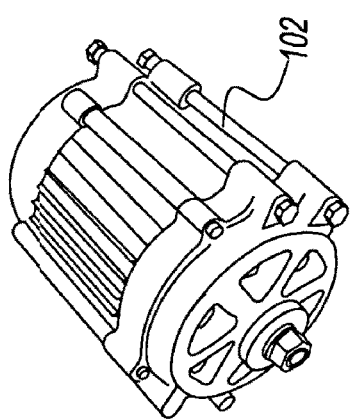
Figure 5D:
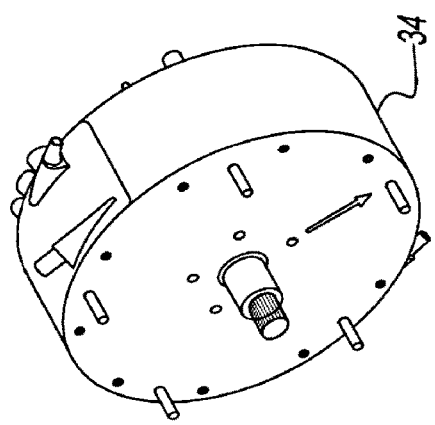

FIGS. 5B-5E show exemplary illustrations of components of the energy cell regenerative system 100. In particular, FIG. 5B is an example of the fan generator or alternator 102. FIG. 5C shows a side view of the alternator 102 with the blades 164 of the rotor 162 mounted concentrically around at least a part of the alternator. FIG. 5D shows the electric motor 34 adapted for driving the aircraft propeller 20. FIG. 5E is an exemplary view of the plurality of energy cells 108 (e.g., energy cell pack). Although FIGS. 5B-5E each show one embodiment of a system component, the energy cell regenerative system can function with different embodiments of these components, which may have different shapes, configurations and capabilities.

FIGS. 5A and 6 show additional details of the fan generator. In particular, the rotor 162 of the fan generator includes an inner hub 168, which is connected to or contiguous with a drive shaft 170 of the alternator or permanent magnet generator 102. The alternator 102 in the present invention is fitted within the cylinder of the rotor 162 of the fan generator (see FIG. 3) to improve efficiency and cooling. The alternator may also be connected by the drive shaft 170 to the fuselage 24 of the aircraft via a bearing 172, and/or mounted from the fuselage 24 by standoffs 174 and fasteners, such as nuts and bolts 176, 178. The fan generator may further include a flywheel or harmonic balancer 180 to improve efficiency of energy conversion. Electricity (power) produced by the fan generator can be modified by a charge controlling device (not shown), and/or the electricity may flow through a capacitor, supercapacitor, ultracapacitor or battery unit for temporary storage before it gets to the charger for use in recharging depleted energy cells 108. Other components that are known to be part of generators and turbines are not discussed herein, but nevertheless fall within the scope of the present invention.

Figure 7:
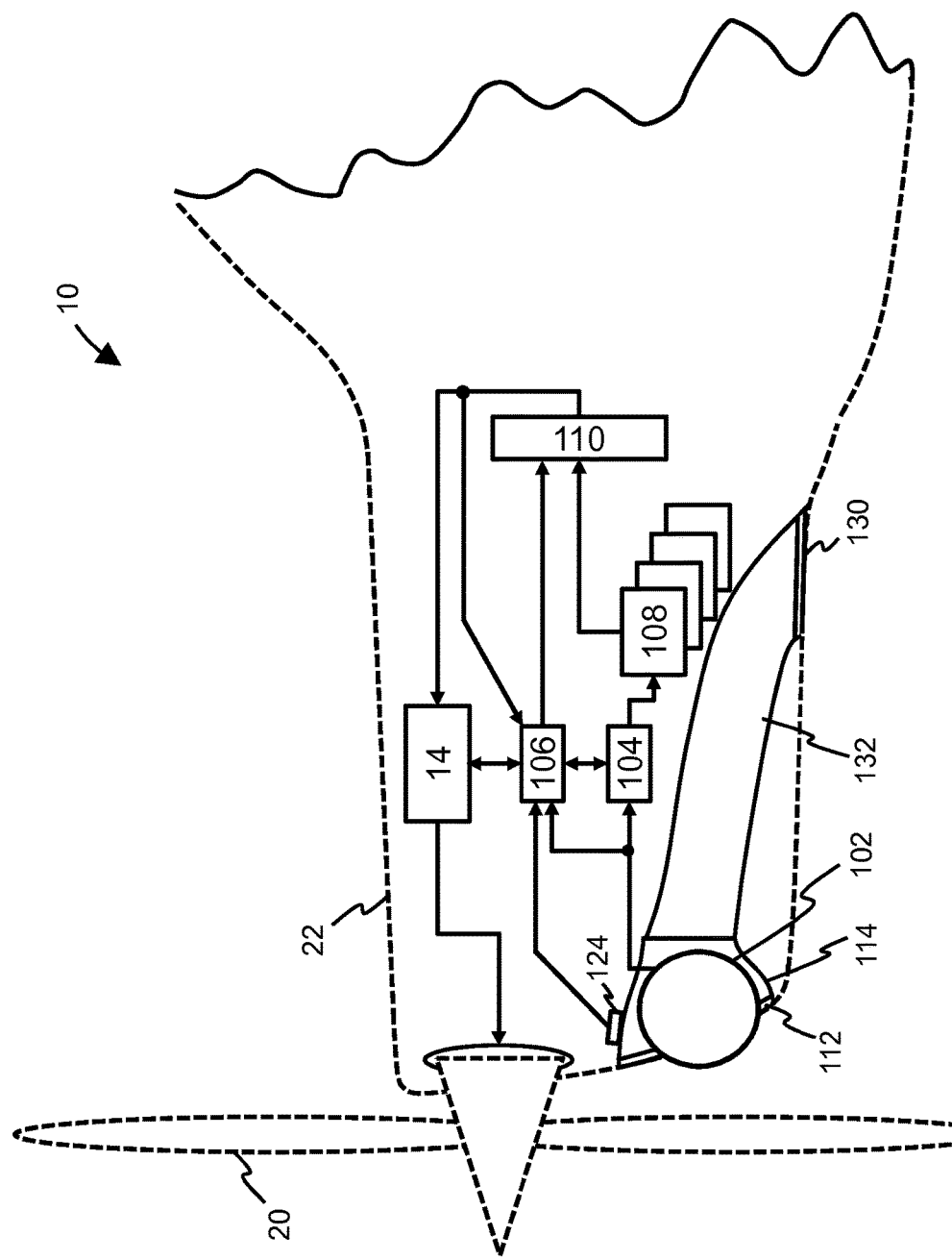
FIG. 7 is a side view of a propeller aircraft with the energy cell regenerative system of FIG. 1 mounted at least partly within the cowling of the aircraft.

The prop blast exiting the fan generator 102, because it will no longer be part of the spiraling slipstream, can be directed beneath the fuselage 24 of the aircraft 10 by any means to either direct or misdirect the turbine blast (i.e., prop blast existing the fan generator) to or away from the surfaces of a rear portion of the aircraft. For example, the exhaust duct 132 and exhaust vent 134 may be arranged to extend from the cowling to the rear portion of the aircraft, thereby providing an aerodynamic effect that makes the aircraft easier to fly at low or stall speeds. In other embodiments, such as shown in FIG. 7, the exhaust duct and exhaust vent direct the blast to exit beneath or through the cowling 22 and/or fuselage 24 with no adverse effect on the aerodynamics and flight characteristics of the aircraft 10.

It is noted that upon the aircraft reaching a cruise speed—for example, 2000-3000 RPM for an internal combustion motor—the prop blast and/or slipstream is nearly constant. The RPM of an electric drive motor, such as electric motor 34, may be different and depends on the pitch of the propeller 20 and design of the electric motor 34. In a preferred embodiment of the present invention, the prop blast velocity may be nearly constant at cruise. The prop blast may be constant enough because the aircraft's forward motion and any turbulence are overwhelmed by the energy of the prop blast, which can exceed, for example, 140 miles per hour. If there are any variations in the velocity of the prop blast through the fan generator 102, a charge controlling device can rectify the electricity produced by the fan generator to have a constant frequency.

The energy cell regenerative system may comprise, or alternatively be associated with, an emergency redundant subsystem to power the aircraft to a safe landing if any faults or malfunctions occur in the energy cell charging/recharging process. In some embodiments, the subsystem comprises the fan generator having a direct connection to the aircraft's propulsion motor and on-board electronics. The fan generator leads are connected directly to the outrunner motor (e.g., stator pins, rotor is stationary) and the propeller, which should continue spinning freely due to its design. The fan generator should continue to spin and generate electricity as a result of the aircraft's forward motion. Alternatively or in addition to the direct connection, the emergency redundant subsystem may comprise its own energy cell(s), independent and separate from the energy cells 108 used during normal operations of the regenerative system. When a fault is detected, the emergency redundant subsystem is initiated, at which point the subsystem's own energy cell(s) automatically power the aircraft's motor and/or on-board electronics, for a short period of time, until safe landing is achieved.

The energy cell regenerative system may comprise, or alternatively be associated with, an airflow control subsystem. Airflow from the main propeller, the forward motion of the aircraft, and the turbine/generator will be managed to reduce turbulence, correctly activate the turbine fan, and provide passages for cooling the various components of the regenerative system. Components which may experience substantial heating include the aircraft motor 34, the fan generator 102, the control unit 106, and the batteries 108. If a fire due to overheating were to occur, the airflow design will help to extinguish the fire and/or route any dangerous gases out of the fuselage and away from the cockpit. The exhaust duct 132 and exhaust vent 130, discussed above, may be part of the airflow control subsystem, and help direct turbine exhaust toward the rear section of the aircraft to improve low speed handling of the aircraft.

In some embodiments, the energy cell regenerative system may also comprise an auto-recharge feature. Such feature is initiated (either manually or automatically) when the aircraft is standing on the tarmac in idle mode before or after flight. While the aircraft motor and propeller are running at low RPM, this auto-recharge feature configures the charger 102 to be connected to all the energy cells 108 for the purpose of recharging all the energy cells simultaneously. Power to the charger is fed directly from the emergency energy cell of the emergency redundant subsystem. When each of the energy cells 108 reach full capacity, the emergency energy cell can be replaced with another fully charged energy cell (before takeoff) or uninstalled and recharged on a bench (after taxiing back to hangar). In some embodiments, instead of the emergency energy cell feeding power to the charger, an aircraft ground power unit or another external power source (e.g., electric grid) is connected to the charger. This arrangement is beneficial in that the emergency energy cell does not have to be replaced or recharged.

The energy cell regenerative system, as described in the above embodiments, contains aeronautic, electric power, electric regeneration, airflow/cooling and redundant subsystems. Each subsystem works together to power the aircraft with DC electric power from engine startup, to taxiing along the runways, during takeoff, ascent, cruise, descent and landing, and finally to parking and engine shutdown. By harnessing the prop blast from the aircraft's propeller, the fan generator converts this free energy into electric energy, which is then used to recharge depleted batteries, which have been used to power the aircraft's motor and electronics, to near capacity voltage. Airflow created by the aircraft's forward motion, the aircraft's propeller, and the turbine fan is used to cool components of the regenerative system as well as other aircraft systems.

Figure 10:
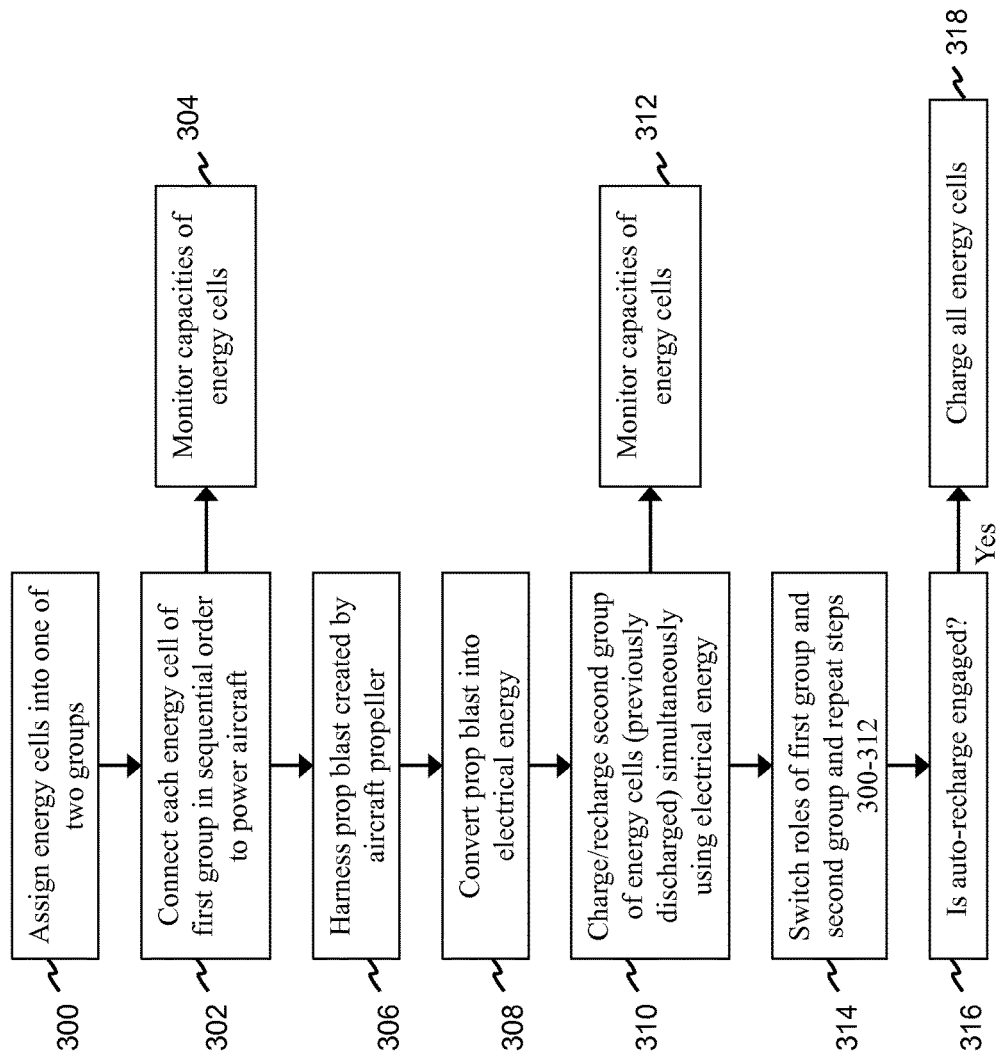
FIG. 10 is a flowchart of a method of using prop blast to power an aircraft using the system of FIGS. 1-7 according to the present teachings.
Figure 11:
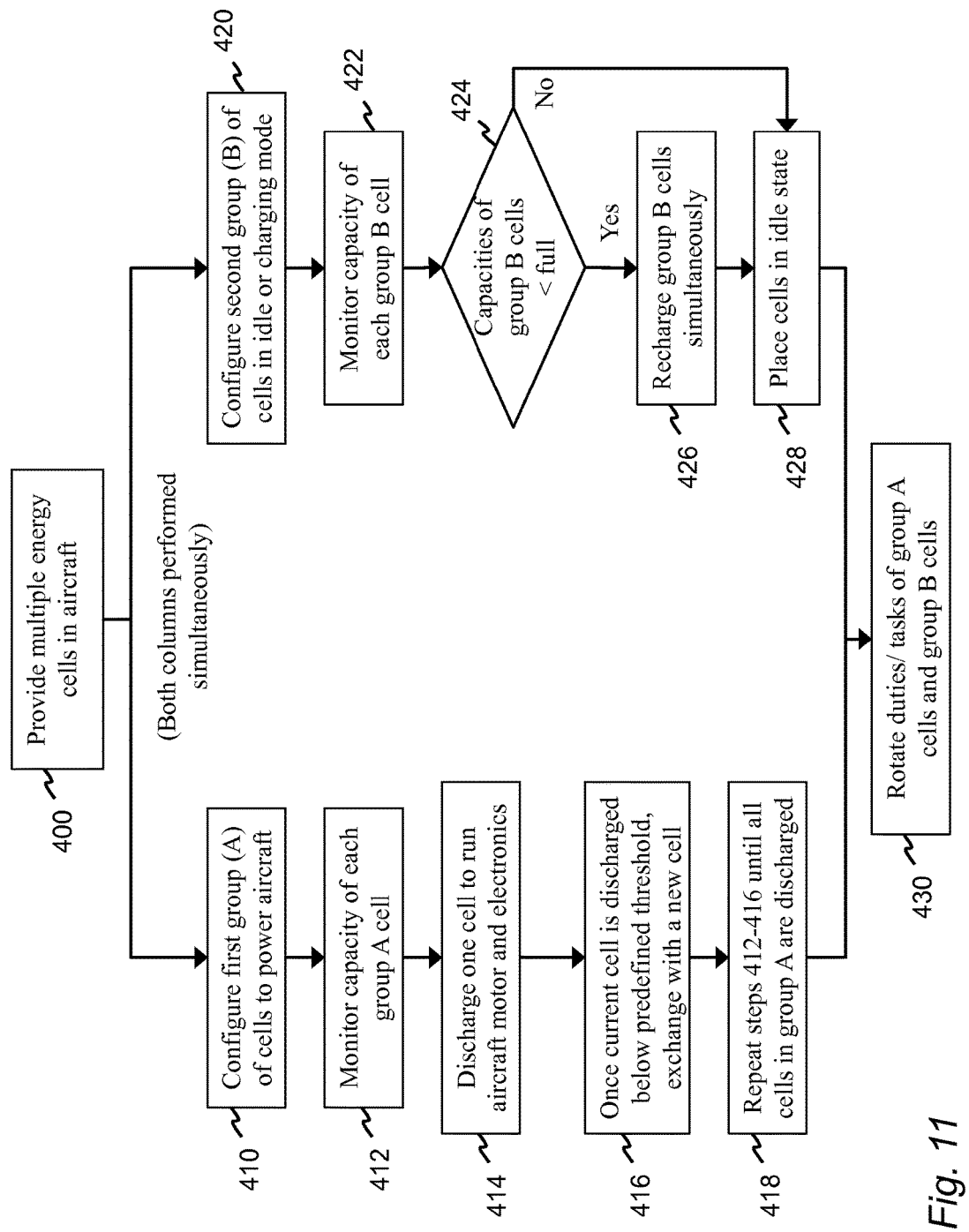
FIG. 11 is a flowchart of a method of charging and discharging energy cells using the system of FIGS. 1-7 according to the present teachings.

Referring to FIGS. 10-11, there is shown flowcharts of one embodiment of a method according to the present teachings. The method can be embodied in software or control algorithms stored and running on the control unit 106. In FIG. 10, the method of powering the aircraft using the energy cell regenerative system comprises the following steps of: providing multiple energy cells (e.g., batteries) for the aircraft and assigning the energy cells into one of two groups (step 300); connecting each energy cell of the first group in sequential/consecutive order—i.e., connect one energy cell, let it discharge below a predefined low capacity threshold, then connect another energy cell—to power the propulsion motor and aircraft electronics (step 302), and while the connecting step 302 is performed, monitoring the capacities of the energy cells in the first group (step 304). While the energy cells of the first group run the aircraft motor and thus spin the aircraft propeller, the method further comprises the steps of: capturing or harnessing the propeller blast (step 306); converting the kinetic energy of the prop blast into electric energy using a fan generator (step 308); and using the electric energy to charge/recharge a second group of energy cells, which may have been previously discharged (step 310).

During the charging/recharging step 308, the capacities of the energy cells of the second group are monitored via a voltmeter, battery sensor, or fiber optic current and voltage sensor or the like (step 312). The monitoring step 312 helps with determining when the energy cells of the second group have been fully or substantially fully charged. In particular, the charging/recharging step 310 may further comprise the step of charging/recharging the energy cells simultaneously for a set period of time. The amount of time that each energy cell needs to reach full or substantially full capacity can be determined using information about the capacity of the energy cell before charging begins and information about the rate at which the battery charger can charge the energy cell.

Whichever energy cell requires the most time to charge will dictate how long all the energy cells in the second group will charge. Alternatively or in addition to charging the energy cells for a set period of time, the energy cells may be charged until the capacities of each energy cell is greater than a predefined high capacity threshold (e.g., a value between 70%-100% capacity). The charging/recharging step 310 may further comprise applying individual charging rates for each of the energy cells in the second group. More specifically, the battery charger may be configured to charge each energy cell at different charging rates, wherein the charging rate for an energy cell is proportional to the discharge rate which the energy cell experienced earlier. Alternatively, each of the energy cells is charged at the same charging rate, which can be manually specified or automatically calculated to provide efficient charging to all the energy cells.

FIG. 10 shows that the method further comprises switching the roles of the first group of energy cells and the second group of energy cells (step 314) and repeating the previous steps. The energy cells in the first group would undergo recharging (after having been depleted) while the energy cells in the second group would power the aircraft. It is noted that the energy cell regenerative system is designed such that the amount of time it would take to fully charge the energy cells in one group (i.e., step 310) would be the same or less than the time for the energy cells in the other group to discharge below a predefined low capacity threshold (i.e., step 302). This helps to ensure that the energy cells powering the aircraft start with full or substantially full capacity.

The method of FIG. 10 may also comprise engaging an auto-recharge feature/program when the aircraft is standing idle on the ground before or after flight (step 316); and recharging all energy cells in both groups to full or substantially full capacity (step 318). The electrical energy to charge the energy cells in both groups can be sourced from an emergency or auxiliary energy cell onboard the aircraft. In contrast, the power may be supplied from an aircraft ground power unit or an external power source.

In FIG. 11, the process of charging and discharging energy cells by the energy cell regenerative system comprises the following steps of: providing multiple energy cells for the aircraft (step 400); configuring a first group of energy cells to power the aircraft (step 410); monitoring the capacity of each energy cell in the first group (step 412); using and discharging one energy cell in the first group to run the aircraft motor and electronics (step 414); exchanging the current cell with a new cell in the first group once the current cell is discharged below a predefined low capacity threshold, such as 30%, 20% or 10% (step 416); and repeating steps 412-416 until all cells in the first group are sequentially/consecutively discharged. While steps 410-418 are performed, steps 420-428 are performed at the same time. Specifically, the process further comprises the steps of: configuring a second group of energy cells in an idle or charging mode (step 420); monitoring the capacity of each energy cell in the second group (step 422); determining whether each energy cell in the second group has a full capacity or less than full capacity (step 424); if any of the energy cells have less than full capacity, then recharging the energy cells simultaneously until they have full capacity (step 426); and placing any energy cells in idle state if they reach full capacity before other energy cells in the second group have finished charging (step 428). Step 428 may further comprise initiating balance charging in order to maintain the energy cells in the second group balanced with respect to total voltage. Referring back to step 426, if all the energy cells are detected as having full or substantially full capacities, then step 426 is skipped and step 428 is performed. Once steps 418 and 428 have completed, the method includes rotating the duties/tasks of the first group of energy cells with those of the second group of energy cells (step 430). It is noted that the energy cell regenerative system is designed so that steps 420-428 would finish before or at the same time as steps 410-418 is completed. This ensures that fully charged energy cells are used to power the aircraft.

While the present teachings have been described above in terms of specific embodiments, it is to be understood that they are not limited to those disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A system for providing regenerative power for an aircraft to sustain flight, comprising:
 a plurality of rechargeable energy cells disposed within the aircraft, the energy cells being configured to supply power to a propulsion motor and electronics of the aircraft;
 a fan generator harnessing propeller blast created by an aircraft propeller and converting kinetic energy of the propeller blast into electrical energy;
 a charger receiving the electrical energy generated by the fan generator and using the electrical energy to recharge one or more of the energy cells; and
 a power transfer switch selectively connecting one of the energy cells to the propulsion motor and electronics of the aircraft, such that the energy cells are rotated one at a time to power the propulsion motor and electronics;
 wherein during recharging, the one or more of the energy cells are disconnected by the power transfer switch.

2. The system of claim 1, wherein the charger recharges simultaneously two or more of the energy cells, which have discharged below a predefined low capacity threshold, to a substantially full capacity.

3. The system of claim 2, wherein the charger provides balance charging of the two or more of the energy cells being recharged, the charger monitoring voltages of the two or more of the energy cells and adjusting a rate of charge applied to each of the two or more of the energy cells so that the two or more of the energy cells maintain the same voltage level.

4. The system of claim 1, further comprising a control unit that determines which of the energy cells to recharge and which of the energy cells to use for sequentially powering the aircraft.

5. The system of claim 4, wherein the control unit schedules at least two of the energy cells to be used one after another for powering the aircraft while simultaneously at least another two of the energy cells are charged to substantially full capacity;
 wherein a time for the at least another two of the energy cells to finish charging is less than or equal to a time for the at least two of the energy cells to discharge completely.

6. The system of claim 5, wherein the control unit determines that the at least another two of the energy cells have finished charging to substantially full capacity based on the at least another two of the energy cells each obtaining a capacity greater than a predefined high capacity threshold.

7. The system of claim 5, wherein the control unit determines that the at least two of the energy cells have each discharged completely based on the at least two of the energy cells each having a capacity less than a predefined low capacity threshold.

8. The system of claim 4, wherein the control unit controls the charger with respect to a charging rate applied to each of the one or more of the energy cells, the control unit setting the charging rate to be proportional to a discharge rate previously experienced by each of the one or more of the energy cells.

9. The system of claim 4, wherein the control unit controls the power transfer switch to connect the one of the energy cells to the propulsion motor and electronics of the aircraft, based on the determination of which cells to use for sequentially powering the aircraft.

10. The system of claim 4, wherein the charger includes an electric switch, said control unit controls the electric switch to connect the charger to the one or more of the energy cells for recharging.

11. The system of claim 4, wherein the control unit is an embedded programmable controller integrated within the charger.

12. The system of claim 4, wherein the control unit monitors electrical property data about each energy cell, said electrical property data comprising at least one of charge/discharge rates, real-time capacity level, input and output wattage, or temperature.

13. The system of claim 12, wherein each energy cell comprises an internal battery management system that measures the electrical property data of the respective energy cell, the battery management system of each energy cell transmitting the electrical property data to at least one of the control unit or charger for processing.

14. The system of claim 4, wherein the control unit regulates a rotational speed at which a rotor of the fan generator spins, thereby providing a steady supply of electrical energy to the charger.

15. The system of claim 14, further comprising an airflow sensor measuring a velocity of the prop blast, wherein the control unit uses the prop blast velocity as feedback to regulate the rotational speed at which the rotor of the fan generator spins.

16. The system of claim 15, wherein the fan generator comprises one or more governors, the control unit directing the one or more governors to adjust a pitch angle of each blade of the rotor to compensate for variations in prop blast velocity and maintain the rotational speed of the rotor at a constant rpm.

17. The system of claim 1, further comprising a supercapacitor or ultracapacitor module electrically connected between the fan generator and the charger, the supercapacitor or ultracapacitor module minimizing voltage spikes in the electrical energy generated by the fan generator.

18. A system for providing regenerative power for an aircraft to sustain flight, comprising:
 a plurality of rechargeable energy cells disposed within the aircraft, the energy cells being configured to supply power to a propulsion motor and electronics of the aircraft;
 a fan generator harnessing propeller blast created by an aircraft propeller and converting kinetic energy of the propeller blast into electrical energy;
 a charger receiving the electrical energy generated by the fan generator and using the electrical energy to recharge two or more of the energy cells;
 a power transfer switch selectively connecting one of the energy cells to the propulsion motor and electronics of the aircraft, such that the energy cells are rotated one at a time to power the propulsion motor and electronics;
 a control unit controlling the fan generator, charger and power transfer switch to recharge the two or more of the energy cells to substantially full charge for subsequent use in powering the propulsion motor and electronics; and
 a supercapacitor or ultracapacitor module and an DC/AC inverter electrically connected between the fan generator and the charger;
 wherein the fan generator outputs the electrical energy as DC power, the supercapacitor or ultracapacitor module minimizes voltage spikes in the DC power, and the DC/AC inverter changes the DC power to AC power for use by the charger;
 wherein during recharging, the two or more of the energy cells are disconnected by the power transfer switch.

19. The system of claim 18, further comprising a blocking diode electrically connected between the fan generator and the supercapacitor or ultracapacitor module, the blocking diode restricting flow of the electrical energy to be only in a direction towards the charger.

20. The system of claim 18, further comprising an intake scoop to collect the propeller blast and direct the propeller blast towards the fan generator.

21. The system of claim 18, further comprising an exhaust duct to direct the propeller blast exiting the fan generator to a rear of the aircraft.

22. A method of providing regenerative power for an aircraft to sustain flight, comprising the following steps of:
 installing a plurality of energy cells into the aircraft, the energy cells being adapted to supply power to a propulsion motor and electronics of the aircraft;
 assigning the energy cells into one of a first group and a second group;
 connecting each energy cell of the first group via a power transfer switch to the propulsion motor and electronics one at a time such that the energy cells of the first group sequentially power the propulsion motor and electronics for cruise flight,
 disconnecting each energy cell of the second group from the propulsion motor and electronics;
 recharging the energy cells of the second group simultaneously via a charger while the energy cells of the first group are powering the propulsion motor and electronics; and
 switching tasks of the first group and the second group when the energy cells of the first group have discharged substantially, such that the connecting step is applied to the second group and the disconnecting and recharging steps are applied to the first group;
 wherein the recharging step includes the steps of:
  harnessing propeller blast created by the propulsion motor spinning a propeller; and
  converting kinetic energy of the propeller blast into electrical energy via a fan generator; and
 wherein the fan generator is mounted to the aircraft downstream of the propeller blast and the fan generator is regulated to have a constant rotational speed to provide a steady supply of the electrical energy to the charger.

23. The method of claim 22, further comprising the step of monitoring continuously property data of each of the plurality of energy cells, the property data including a capacity level and charge/discharge rate;

wherein the step of recharging is completed when the capacity level of each of the energy cells of the second group is equal to or greater than a predefined high capacity threshold.

24. The method of claim 22, further comprising the step of monitoring continuously property data of each of the plurality of energy cells, the property data including a capacity level and charge/discharge rate;

wherein the step of connecting is completed when the capacity level of each of the energy cells of the first group is equal to or less than a predefined low capacity threshold.

25. The method of claim 22, wherein the step of recharging includes providing balance charging to avoid overcharging and undercharging the energy cells of the second group, such that the energy cells of the second group are maintained at the same voltage.

26. The method of claim 22, wherein during takeoff, at least two of the energy cells of the first group are connected in series via the power transfer switch to the propulsion motor and electronics at the same time to provide increased voltage to the propulsion motor and electronics.

\* \* \* \* \*